United States Patent
Lu et al.

(10) Patent No.: US 11,972,052 B2
(45) Date of Patent: Apr. 30, 2024

(54) INTERACTIVE HUMAN PREFERENCE DRIVEN VIRTUAL TEXTURE GENERATION AND SEARCH, AND HAPTIC FEEDBACK SYSTEMS AND METHODS

(71) Applicant: University of Southern California, Los Angeles, CA (US)

(72) Inventors: Shihan Lu, Los Angeles, CA (US); Heather Culbertson, Los Angeles, CA (US); Matthew Fontaine, Los Angeles, CA (US); Mianlun Zheng, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 177 days.

(21) Appl. No.: 17/725,694

(22) Filed: Apr. 21, 2022

(65) Prior Publication Data
US 2022/0382375 A1    Dec. 1, 2022

Related U.S. Application Data

(60) Provisional application No. 63/184,659, filed on May 5, 2021.

(51) Int. Cl.
| | |
|---|---|
| *G06F 3/01* | (2006.01) |
| *G06N 3/045* | (2023.01) |
| *G06N 3/086* | (2023.01) |
| *G06N 3/088* | (2023.01) |

(52) U.S. Cl.
CPC ............ *G06F 3/016* (2013.01); *G06N 3/045* (2023.01); *G06N 3/086* (2013.01); *G06N 3/088* (2013.01)

(58) Field of Classification Search
CPC .... G06F 3/016; G06F 3/0346; G06F 3/03545; G06N 20/00; G06N 3/045; G06N 3/0475; G06N 3/086; G06N 3/088; G06N 3/094; G06N 3/126

See application file for complete search history.

(56) References Cited

U.S. PATENT DOCUMENTS

| | | | |
|---|---|---|---|
| 11,557,078 B1 * | 1/2023 | Scherer | G06F 30/12 |
| 2008/0291161 A1 * | 11/2008 | Massie | G06F 3/016 |
| | | | 345/156 |

(Continued)

FOREIGN PATENT DOCUMENTS

GB    2573091 A  * 10/2019 ............ A63F 13/211

*Primary Examiner* — Kenneth Bukowski
(74) *Attorney, Agent, or Firm* — Pillsbury Winthrop Shaw Pittman LLP

(57) ABSTRACT

Human interactive texture generation and search systems and methods are described. A deep convolutional generative adversarial network is used for mapping information in a latent space into texture models. An interactive evolutionary computation algorithm for searching a texture through an evolving latent space driven by human preference is also described. Advantages of a generative model and an evolutionary computation are combined to realize a controllable and bounded texture tuning process under the guidance of human preferences. Additionally, a fully haptic user interface is described, which can be used to evaluate the systems and methods in terms of their efficiency and accuracy of searching and generating new virtual textures that are closely representative of given real textures.

21 Claims, 16 Drawing Sheets

(56) References Cited

U.S. PATENT DOCUMENTS

| | | | |
|---|---|---|---|
| 2012/0141949 A1* | 6/2012 | Bodony | G01B 11/25 |
| | | | 600/407 |
| 2018/0341836 A1* | 11/2018 | Lim | G06F 18/2413 |
| 2019/0355167 A1* | 11/2019 | Nakao | G06F 17/11 |
| 2019/0384964 A1* | 12/2019 | Ando | G06V 20/647 |
| 2020/0218354 A1* | 7/2020 | Beattie | G06T 7/41 |
| 2021/0121781 A1* | 4/2021 | Benedetto | A63F 13/67 |
| 2022/0051481 A1* | 2/2022 | Laine | G06T 19/20 |
| 2022/0147829 A1* | 5/2022 | Kubota | G06N 20/00 |

* cited by examiner

| Texture | # of iterations | # of friction tuning | Time (mins) |
|---|---|---|---|
| ABS | 5.2±2.77 | 2.2±0.84 | 4.44±1.28 |
| Wood | 5±4.53 | 3.2±1.64 | 4.35±2.25 |
| Fiberglass | 5.4±2.70 | 2.4±1.14 | 4.38±0.79 |
| Canvas | 4.4±1.52 | 2.4±1.34 | 5.01±2.2 |
| Stone | 3.8±1.10 | 1.8±1.64 | 3.56±0.79 |

FIG. 14

INTERACTIVE HUMAN PREFERENCE DRIVEN VIRTUAL TEXTURE GENERATION AND SEARCH, AND HAPTIC FEEDBACK SYSTEMS AND METHODS

RELATED PATENT APPLICATION

This patent application claims the benefit of Provisional Patent Application No. 63/184,659 filed on May 5, 2021, entitled "INTERACTIVE TEXTURE GENERATION AND SEARCH SYSTEM DRIVEN BY HUMAN PREFERENCE", naming Shihan LU, Heather CULBERTSON, Matthew FONTAINE and Mianlun ZHENG as inventors. The entire content of the foregoing patent application is incorporated herein by reference, including all text, tables and drawings.

BACKGROUND

1. Field

The present disclosure relates generally to virtual texture generation and search techniques, and haptic feedback.

2. Description of the Related Art

Generation of haptic feedback that accurately simulates realistic textures (e.g., metal textures, wood textures, carpet textures, foam or other soft textures, etc.) is an area of interest in the field of haptics. There are numerous textures in the physical world, and it is time consuming and laborious to manually search and record information representative of more than just a small handful of these textures due to current recording procedures, and the limited number of specific devices configured for such recording (which are not widely available). Thus, current technology is limited in its ability to provide haptic feedback that accurately simulates a wide range of realistic textures.

SUMMARY

The following is a non-exhaustive listing of some aspects of the present techniques. These and other aspects are described in the following disclosure.

Some aspects include a system comprising: a motorized touch device configured to apply haptic force feedback on a hand, allowing users to feel virtual objects and touch sensations; at least one programmable processor; and a non-transitory machine-readable medium storing instructions which, when executed by the at least one programmable processor, cause the at least one programmable processor to perform operations comprising: training, based on training data associated with textures of materials, a texture model generator to map a set of latent variables to haptic texture models; and performing, via the texture model generator, a texture search by an algorithm configured to search a desired virtual texture through evolving latent variables in a desired region in a latent space, such that the virtual texture can be provided to a user with the motorized touch device.

Some aspects include a method comprising: training, based on training data associated with textures of materials, a texture model generator to map a set of latent variables to texture models; and performing, via the texture model generator, a texture search by an algorithm configured to search a desired texture through evolving latent variables to a desired region in a latent space.

In some embodiments, the texture model generator is a deep convolutional generative adversarial network (DCGAN). The DCGAN includes a first group of multi-layer perceptrons as a generator G to map the set of latent variables to the texture models, and a second group of multi-layer perceptrons as a discriminator D to determine whether a texture model generated by the generator G is accurate based on a comparison with a reference texture model.

In some embodiments, the training of the texture model generator comprises: obtaining training data comprising: (i) textures for different categories of materials, (ii) friction data associated with the textures, and (iii) haptic texture data associated with the textures; and training, based on the training data, the texture model generator based on a DCGAN algorithm to cause the generator G to generate texture models perceptually similar to real textures of the materials.

In some embodiments, the friction data is generated by a friction model configured to allow a user to tune friction coefficients based on user perceived resistance of a texture via a user interface. In some embodiments, the friction data is determined from the normal and tangential forces of movement based on a Coulomb friction model.

In some embodiments, the haptic texture data comprises at least one of: reflection coefficients corresponding to texture roughness of the textures, velocities and forces of movements performed by the user on a particular texture via a user interface, texture roughness data associated with the textures, or autoregressive coefficients that model the texture roughness of the textures.

In some embodiments, the texture search comprises: evolving of the latent variables associated with the texture model generator using a Covariance Matrix Adaptation Evolution Strategy (CMA-ES).

In some embodiments, the texture search comprises: sampling a first set of latent variables from a normal distribution having a same dimensionality as the latent space of the texture model generator; inputting the first set of latent variables to the texture model generator to generate one or more texture models; rendering the one or more texture models via a haptic user interface to allow users to touch the one or more texture models; receiving a user selection of a texture model from the one or more texture models, the user selected texture model being closest to a given real texture; updating, based on the user selected texture model, a mean of the normal distribution; adapting a covariance of the normal distribution to increase a probability of the texture search; and sampling a second set of latent variables using the updated normal distribution and performing the above steps until the user is satisfied that the selected texture model is close enough to the given real texture.

Some aspects include a tangible, non-transitory, machine-readable medium storing instructions that when executed by a data processing apparatus (e.g., a processor or a computing system) cause the data processing apparatus to perform one or more of the above-mentioned operations.

BRIEF DESCRIPTION OF THE DRAWINGS

The above-mentioned aspects and other aspects of the present techniques will be better understood when the present application is read in view of the following figures in which like numbers indicate similar or identical elements:

FIG. 14 illustrates a table showing the evaluation metrics and results for texture generation and search during the experimental procedures of Phase 1 of the study described in FIG. 13.

Figure 1:
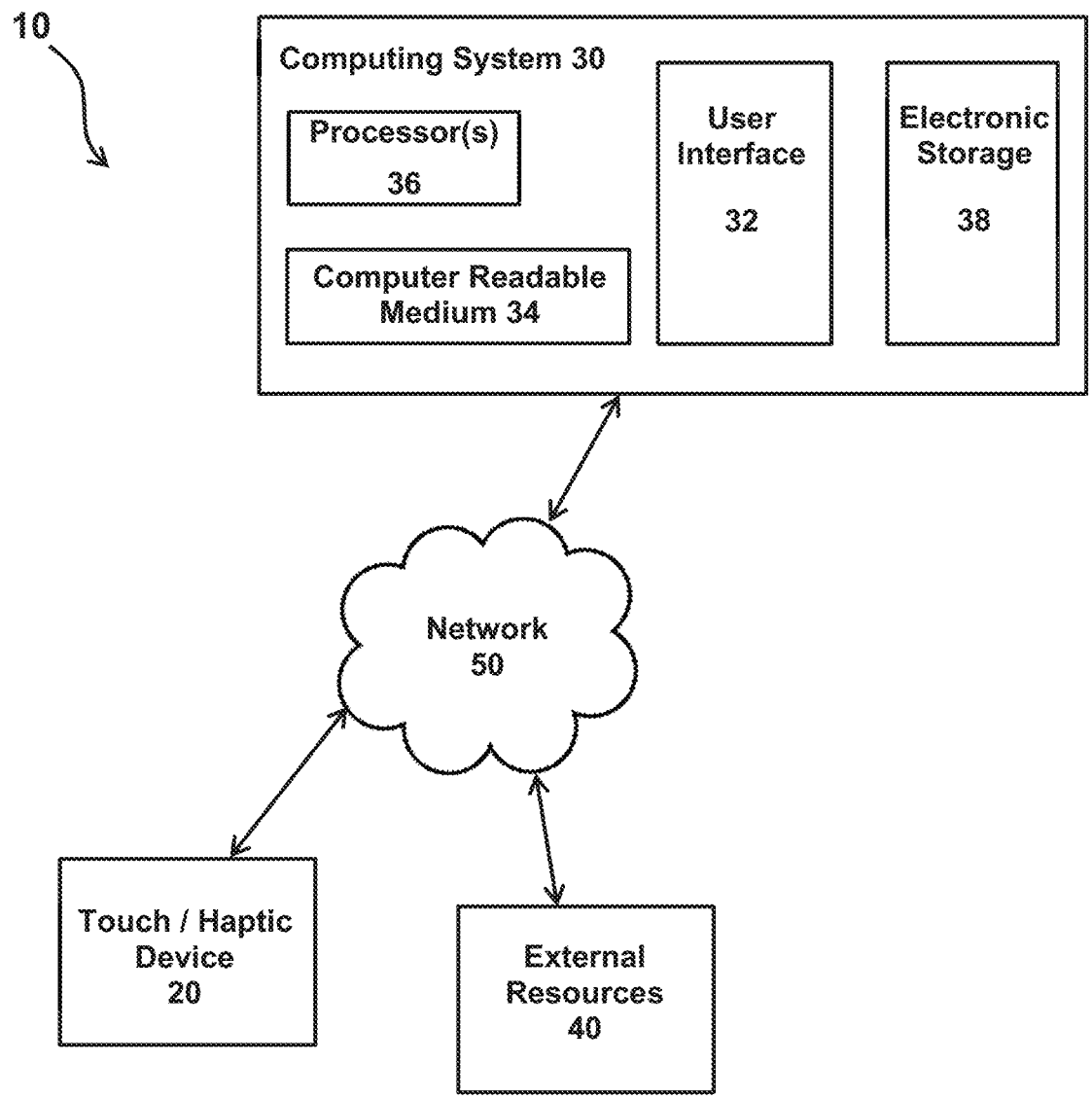
FIG. 1 is a schematic illustration of components of an embodiment of the present system.

While the invention is susceptible to various modifications and alternative forms, specific embodiments thereof are shown by way of example in the drawings and will be described in detail below. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventor had to both invent solutions and, in some cases just as importantly, recognize problems overlooked (or not yet foreseen) by others in the field of throwing motion training systems. The inventors wish to emphasize the difficulty of recognizing those problems that are nascent and will become much more apparent in the future should trends in industry continue as the inventor expects. Further, because multiple problems are addressed, it should be understood that some embodiments are problem-specific, and not all embodiments address every problem with traditional systems described herein or provide every benefit described herein. That said, improvements that solve various permutations of these problems are described below.

An area of interest in the field of haptics is generating realistic haptic representations of textures in tool-surface interactions. For prior data-driven methods, most approaches aim to reproduce haptic signals recorded from a physical interaction of a measurement tool with a surface having a certain texture, using a variety of data-driven electronic models. Typical texture modeling and rendering methods for tool-surface interactions can capture some key dimensions of haptic perception. However, there are still several limitations which currently hinder improvements and limit large scale virtual texture modeling and generation.

For example, there are numerous textures in the physical world, but it is time consuming and laborious to manually search and record haptic data for a large amount of these textures with current measurement tools. Further, only certain tools are configured for recording this type of haptic data. These tools may not be available to most users. Even if these recording tools were available, during the recording of haptic data about a surface, a tool can easily get stuck on a soft surfaces such as foams or rugs, and certain high friction surface textures can also cause a measurement tool to record a noncontinuous (e.g., disjointed) motion. Thus, simply forming a large database of haptic data about various different surface textures by manually recording surface texture datasets with existing tools is not feasible.

In addition, with the increasing demand for texture perception in the area of virtual computer-aided processes such as fashion design, product review, and surgical training, open-source datasets which collect the haptic texture signals in tool-surface interactions in databases have been generated. These haptic texture databases facilitate idea exchange in related haptic research fields and further the communication between researchers from different areas. Haptic texture modeling is shifting from physics-based simulations to data-driven methods with these haptic texture databases. Compared to physics-based simulations, data-driven methods regard the internal transitional mechanisms from interactions to haptic feedback as a black box, and directly map the inputs (e.g., interactive motion) to outputs (e.g., haptic feedback) using certain assumptions and constraints. This mapping process relies on pre-recorded vibrotactile signals.

Recent electronic haptic texture models generated from recorded haptic texture datasets have been created for acceleration signals as an autoregressive (AR) process, defined by a set of AR coefficients and a variance of prediction error. Due to high nonlinearity in AR coefficient computation, it is not currently possible to find an interpretable relationship between AR coefficients and texture attributes (e.g., for then generating a haptic feedback representation of the texture).

In data-driven methods for texture modeling and rendering, there exists an intrinsic gap in the transition from texture recording to texture rendering associated with differences in recording and rendering devices. Data-driven methods have focused on minimizing differences in certain characteristics, such as a frequency spectrum between a recorded signal and a modelled signal. However, these differences are exaggerated by inaccurate data models.

FIG. 1 illustrates an embodiment of an interactive human preference-driven virtual texture generation and search, and haptic feedback system 10. In some embodiments, system 10 comprises a touch/haptic device 20, a computing system 30, external resources 40, a network 50, and/or other components. Advantageously, in some embodiments, system 10 comprises a deep convolutional generative adversarial network for mapping latent variables to texture models, and an interactive evolutionary computation algorithm for texture searching via evolving latent variables driven by human preference. This combines the advantages of a generative model and evolutionary computation to realize a controllable and bounded texture tuning process under the guidance of human preference. In an embodiment, a fully haptic user interface is provided to evaluate the system in terms of its efficiency and accuracy of searching and generating new virtual textures close to the given real textures.

For example, touch/haptic device 20 may be used to record haptic data, and provide or render haptic data to a user. When device 20 is used to record haptic data, an implement of device may be moved across a surface by user. Device 20 records information such as a position (in x, y, and z dimensions), a velocity, an acceleration, an orientation, vibrations, etc., of the implement as the implement is moved. When device 20 is used to provide or render haptic data to a user, the user grips the implement and moves to different positions (in x, y, and z dimensions) with different velocities, and device 20 generates different force, vibrations for the current position and velocity, to mimic the experience of feeling a texture of a given surface through a tool, for example. In some embodiments haptic device 20 comprises a motorized stylus (or other implement) that applies haptic (force) feedback on user's hand, allowing the user to feel virtual objects and touch sensations, a digital encoder for measuring the translation of the stylus (or implement), and a linearity potentiometer for measuring the rotation of the stylus (or implement). An example of such a device is the Touch from 3D Systems (https://www.3dsystems.com/haptics-devices/touch).

Figure 2:
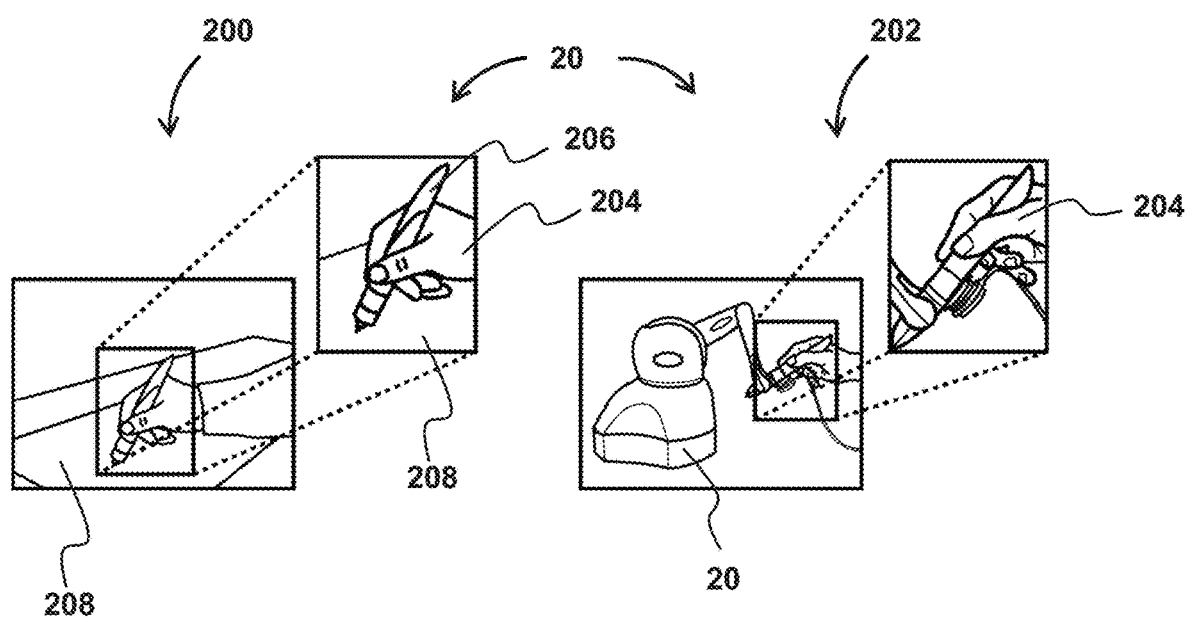
FIG. 2 illustrates an example embodiment of a touch/haptic device.

FIG. 2 illustrates an example embodiment of a touch/haptic device 20. FIG. 2 illustrates device 20 being used to record 200 haptic data, and provide or render 202 haptic data to a user 204. When device 20 is used to record 200 haptic data, an implement 206 of device 20 is moved across a surface 208 by user 204. Device 20 records information such as a position (in x, y, and z dimensions), a velocity, an acceleration, an orientation, vibrations, etc., of implement 206 as implement 206 is moved. When device 20 is used to provide or render 202 haptic data to user 204, user 204 grips implement 206 and moves implement 206 to different positions (in x, y, and z dimensions), with different velocity, orientations, etc. Device 20 provides or renders 202 the haptic data (e.g., forces, vibrations, etc.) for the current position and velocity of implement 206 to user 204 via implement 206, to mimic the experience of touching a texture of a given surface through a tool, for example. Device 20 may be motorized (e.g., include one or more motors), and include various mechanical components configured to cause device 20 to operate as described.

Returning to FIG. 1, computing system 30 may be a server, a desktop computer, a laptop computers, a smart phone, a tablet, a gaming device, or other networked computing device, having a user interface 32 including a display and a user input device (e.g., buttons, keys, voice recognition, or a single or multi-touch touchscreen), memory 34, 38 (such as a tangible, machine-readable, non-transitory medium), a network interface, an energy source (e.g., a battery), and a processor such as processor 36 (a term which, as used herein, includes one or more processors) coupled to each of these components. The memory (e.g., computer readable medium 34 or electronic storage 38) of computing system 30 may store instructions that when executed by processor 36 provide an operating system and various applications, including a web browser or a native mobile application, for example. In addition, computing system 30 may include a user interface 32, which may include a monitor; a keyboard; a mouse; a touchscreen; etc. User interface 32 may be operative to provide a graphical user interface associated with system 10 that communicates with device 20 or processor 36, and facilitates user interaction with data from system 10.

Processor 36 is configured to provide information processing capabilities in system 10. As such, processor 14 may include one or more of a digital processor, an analog processor, a digital circuit designed to process information, an analog circuit designed to process information, a state machine, and/or other mechanisms for electronically processing information. In some embodiments, processor 36 may be included in and/or otherwise operatively coupled with device 20, computing system 30, and/or other components of system 10. Although processor 36 is shown in FIG. 1 as a single entity, this is for illustrative purposes only. In some implementations, processor 36 may include a plurality of processing units. These processing units may be physically located within the same device (e.g., computing system 30), or processor 36 may represent processing functionality of a plurality of devices operating in coordination (e.g., a processor located within device 20 and a second processor located within computing system 30).

In some embodiments, processor 36 is configured to execute one or more computer program components. Computer program components may be computer code or other instructions that cause one or more of the operations described herein, for example. Processor 36 may be configured to execute computer program components by software; hardware; firmware; some combination of software, hardware, and/or firmware; and/or other mechanisms for configuring processing capabilities on processor 36. In implementations in which processor 36 includes multiple processing units, one or more of the computer program components may be located remotely from the other components. The description of the functionality provided by the different components is for illustrative purposes, and is not intended to be limiting, as any of the components may provide more or less functionality than is described.

Figure 3:
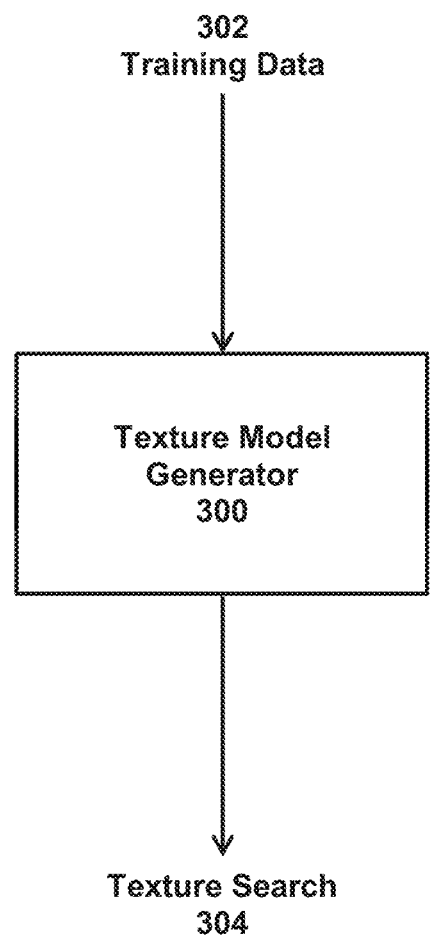
FIG. 3 illustrates a schematic example of a texture model generator.

Processor 36 may be, include, or be configured to train a texture model generator. A schematic example of a texture model generator 300 is illustrated in FIG. 3. Texture model generator 300 may be or include a neural network, classification tree, decision tree, support vector machine, or other model that is trained and configured to operate as described. As an example, neural networks may be based on a large collection of neural units (or artificial neurons). Neural networks may loosely mimic the manner in which a biological brain works (e.g., via large clusters of biological neurons connected by axons). Each neural unit of a neural network may be simulated as being connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

The training may be based on training data 302 associated with textures of materials or other information. Training data 302 may include data associated with textures for different categories of materials, friction data associated with the textures, haptic texture data associated with the textures, or other data. The friction data may be generated by a friction model configured to allow a user to tune friction coefficients based on user perceived resistance of a texture via a user interface. In some embodiments, the friction data is determined from the normal and tangential forces of movement based on a Coulomb friction model. Unlike the haptic texture data, there is no multi-layer neural network and no training for the friction model. The system is configured such that the user may adjust the Coulomb friction coefficients in the friction model directly. The haptic texture data comprises at least one of: autoregressive coefficients and variance of autoregressive prediction errors which are computed from the vibration data generated from user's interaction with a surface through a tool, and velocities and forces of movements performed by the user on a particular texture via a user interface.

Texture model generator 300 (e.g., processor(s) 36) may be trained to map a set of latent variables to texture models. A latent space is an unobservable space spanned by latent variables, but can be used to describe meaningful and observable data (e.g., texture model in this case) via certain transformations from latent variables. The transformation in this case is the texture model generator 300. Latent variables are a set of variables sampled from the latent space, as described above. The texture model generator 300 is similar to a function that transforms the unobservable and meaningless latent variables to observable and meaningful texture models. This may be understood to be mapping a set of latent variables to texture models, for example. A texture model is a single model for a specific real texture. Texture model generator 300 is a generator to generate texture models based on latent variables.

Texture model generator 300 may be a deep convolutional generative adversarial network (DCGAN), for example. The DCGAN may include a first group of multi-layer perceptrons as a generator G to map the set of latent variables to the texture models, and a second group of multi-layer perceptrons as a discriminator D to judge whether the texture model generated by the generator G is perceptually realistic based on a comparison with a reference texture model. The training of texture model generator 300 may comprise obtaining the training data (as described above) and providing the training data as input to texture model generator 300. Texture model generator 300 is trained based on the DCGAN algorithm to cause the generator G to generate texture models perceptually similar to real textures of the materials associated with the training data.

Processor 36 (FIG. 1) may be configured to perform a texture search 304. The search may be performed via texture model generator 300, using an interactive evolutionary algorithm configured to search a desired texture through evolving latent variables to a desired region in a latent space driven by a user preference. Texture search 304 may rely on texture model generator 300 to search a desired texture. The search keeps changing the input of the texture model generator 300 following a user's selection from among a set of generated texture models, until the user is satisfied with their final selection (e.g., as described herein).

In some embodiments, the texture search comprises evolving of or recursively changing the latent variables associated with texture model generator 300 using a Covariance Matrix Adaptation Evolution Strategy (CMA-ES). In some embodiments, the texture search comprises sampling a first set of latent variables from a normal distribution having the same dimensionality as the latent space associated with texture model generator 300; inputting the first set of latent variables to the texture model generator to generate one or more texture models; rendering the one or more texture models via a haptic user interface to allow users to touch the one or more texture models; and receiving a user selection of a texture model from the one or more texture models. The user selected texture model is closest to a given real texture. The texture search also includes updating, based on the user selected texture model, the mean of the normal distribution; adapting the covariance of the normal distribution to increase a probability of the texture search; and sampling a second set of latent variables using the updated normal distribution and performing above steps until the user is satisfied that the selected texture model is close enough to the given real texture.

Figure 4:
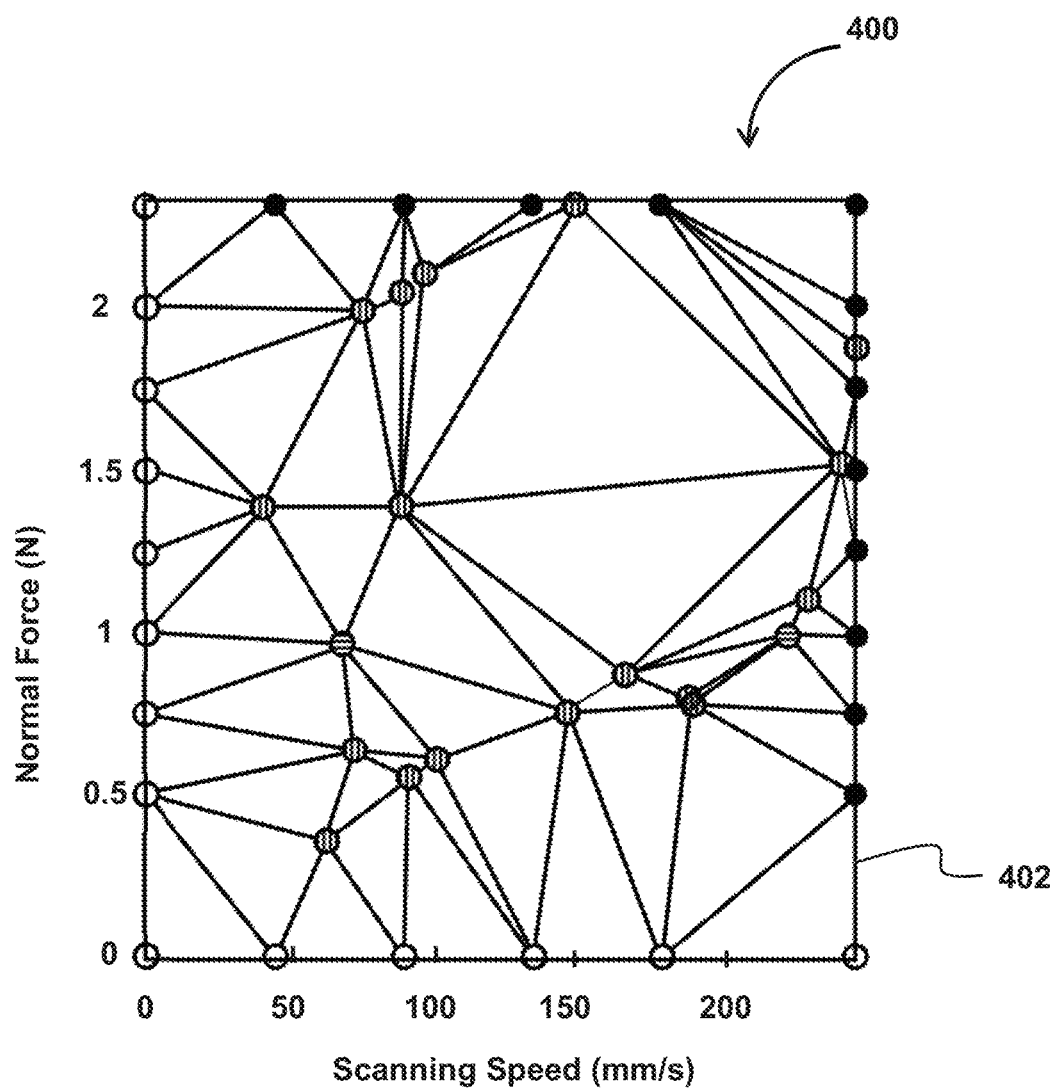
FIG. 4 illustrates an example of a haptic texture dataset for a single material.

FIG. 4-14, and the related discussion below, provide explanation of the concepts introduced above. For example, FIG. 4 illustrates an example of a haptic texture dataset 400 for a single material. Dataset 400 may be an example one of several existing vibrotactile-based texture datasets, as described above. Data like the data shown in FIG. 4 may be collected by a device similar to or the same as device 20 shown in FIG. 2, for example. As shown in FIG. 4, normal forces and scanning speeds are recorded at several locations (e.g., dots) across a surface 402. The different shading of the dots categorizes models into different types. In this example, the dots represent haptic texture models from the recorded data segments; texture models at max force/speed; and texture models at zero force/speed.

Interpolation in combination with generative adversarial network (GAN) models can be used to determine intermediate (e.g., between measured points on a surface) vibrotactile signals in a continuous manner by linearly sampling latent variables. This demonstrates the possibility of controllably directing a user's perception of vibrotactile patterns through sampling in the latent space of GAN models. However, such sampling may only be able to be performed in a monotonic direction between two pre-defined textures, which may limit its usefulness. Interactive Evolutionary Computation (IEC) may be used to optimize vibrotactile properties when users interact with a given tactile feedback system. Compared to manually crafted universal vibrotactile patterns determined based on prior knowledge, interactive generation of vibration can effectively fit specific users and applications.

Returning to FIG. 1, processor 36 may be configured to determine a generative model based on data similar to or the same as the data shown in FIG. 4, or stored in corresponding databases. Such data may represent different textures in different texture categories (e.g., metal to carpet, etc.) and include friction data, velocity data, force data, or other data, for example.

Friction significantly affects a person's sensory perception when interacting with a texture. For example, friction has a direct impact on a person's perception of slipperiness either by bare fingers or through a tool. Processor 36 may be configured such that a friction model models a friction coefficient for a tool tip (e.g., of implement 206 shown in FIG. 2) dragging across a surface as the Coulomb friction, where $\mu_k=F_f/F_n$, by finding the slope of the line which fits the recorded tangential $F_f$ and normal $F_n$ forces. $F_n$ and $F_f$ are extracted from a recording with a smooth dragging movement across a textured surface based on the surface plane ($\hat{e}_n$) and motion direction ($\hat{e}_f$) calculated from position data. The friction model also adds viscous damping around zero velocity to stabilize the rendering, and the slope of the viscous damping is set as a constant for all textures.

Figure 5:
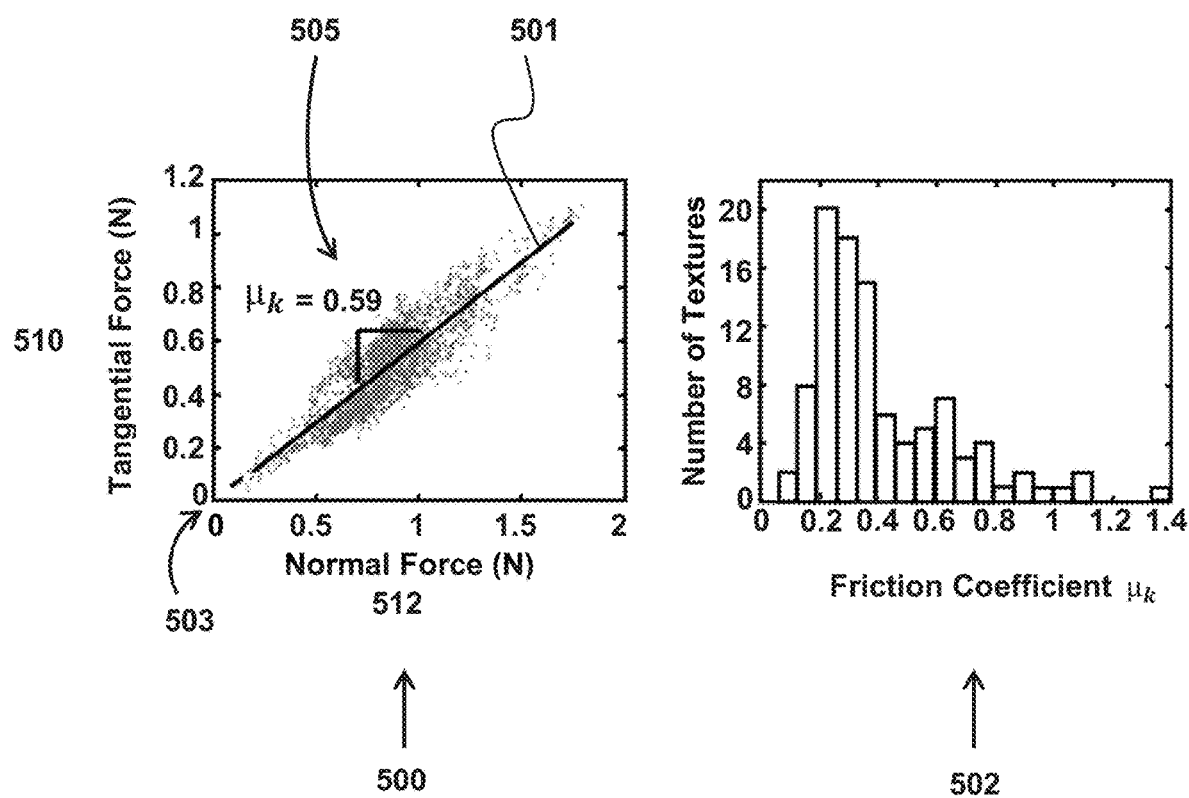
FIG. 5 illustrates computation of a Coulomb friction coefficient by fitting a line through the origin, and a distribution of Coulomb friction coefficients across datasets.

FIG. 5 illustrates computation 500 of a Coulomb friction coefficient by fitting a line 501 through the origin 503, and a distribution 502 of Coulomb friction coefficients across datasets. As described above, computation 500 comprises finding the slope 505 of line 501 which fits recorded tangential $F_f$ 510 and normal $F_n$ 512 forces. Considering that the friction model is controlled by a single scalar of the friction coefficient, the present disclosure contemplates a slider (or some other user interface component) for users to directly tune the friction coefficient based on their perceived resistance.

The amplitude and frequency of vibrations (e.g., recorded using a device similar to or the same as device 20 shown in FIG. 2) may be regarded as an indicator of texture roughness. Processor 36 is configured such that, for a haptic texture model, a vibration signal recorded at 10000 Hz (for example) is modelled as a pairwise autoregressive (AR) process as a function of a medium velocity and force in this period (e.g., as shown in FIG. 4), according to Equation (1):

$$s[n]=E_{k=1}^{p}a_k s[n-k]+e[n] \quad (1)$$

where p is the AR order, $a_k$ is the $k^{th}$ AR coefficient, and e[n] is the prediction error.

Processor 36 is configured such that AR coefficients are estimated by minimizing the variance of prediction error via a Levinson-Durbin algorithm. The AR process can also be represented as a "all-pole" discrete-time transfer function, according to Equation (2):

$$\frac{S(z)}{E(z)} = \frac{1}{1 - \sum_{k=1}^{p} a_k z^{-k}} = \frac{1}{A_p(z)}. \quad (2)$$

To standardize terminology, a set of AR coefficients and the variance of prediction errors define an AR model. Implicitly, the variance of the prediction errors encodes an amplitude component and the AR coefficients of the model encode a frequency component. Each dot (vertex) in FIG. 4 is an AR model for a certain force and speed, and all dots (vertices) in FIG. 4 constitute a haptic texture model for a texture.

For GAN training, AR coefficients may be difficult to interpret and sensitive to quantizing errors. In addition, subtle disturbances can lead to instability of a system, which occurs when poles of a transfer function may not be within a unit circle in the complex plane, for example. As such, alternative forms such as line spectral frequencies (LSF) and reflection coefficients may be employed by processor 36.

LSF is a desirable alternative to quantization of the roots of $A_p(z)$ based on line spectrum pair polynomials. LSF is not overly sensitive to quantization noise and provides a stable system when the coefficients are monotonically increasing and in the bound of [0; π]. Reflection coefficients may be used as a representation of an AR process, since they can be easily converted to and from AR coefficients without information loss, and they are robust with respect to quantization error. Reflection coefficients are a type of coefficient used to encode the time-series signals, e.g., vibration signal in this case. It is an alternative method to describe the vibration signal, compared to the autoregressive coefficients. In addition, reflection coefficients have a physical interpretation which makes them amenable to interpolation. When the absolute values of reflection coefficients are less than 1, a stable system is implied. Here, for the convenience of model construction and fast learning process, reflection coefficients may be chosen over LSF, because of their symmetric data scale and fewer constraints on parameters. So, the AR coefficients may be converted to reflection coefficients before the training of GAN, for example.

Figure 6:
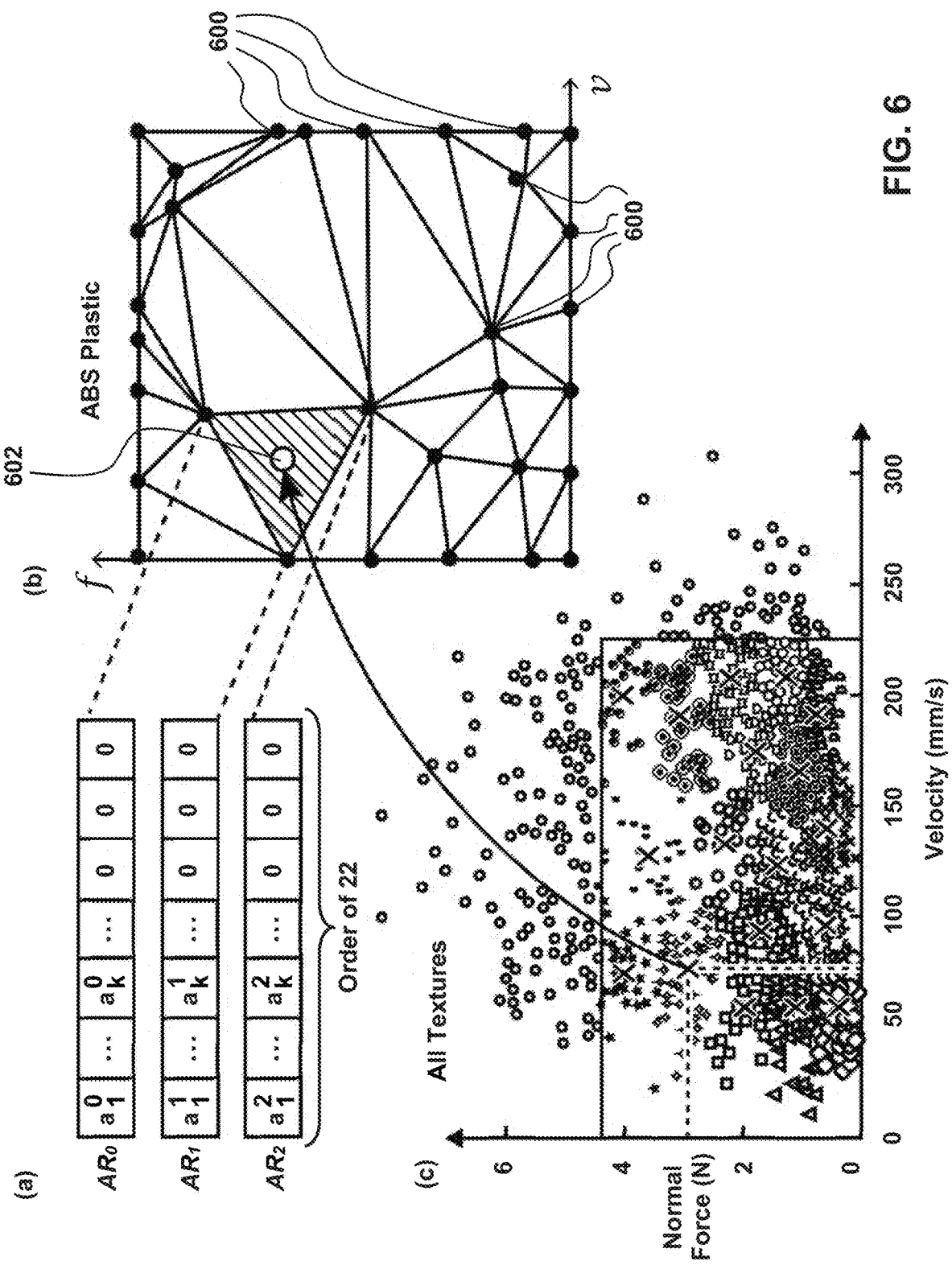
FIG. 6 illustrates haptic texture data structuralization.

FIG. 6 illustrates haptic texture data structuralization. Since processor 36 (FIG. 1) is configured such that the AR coefficients are computed by the Levinson-Durbin algorithm, for the best fitting result, the selection of AR order (the number of AR coefficients) relies on the recorded signals. So, for an existing dataset, a haptic texture model may not be well structured due to the inconsistent number of AR coefficients among all the textures or other factors. Processor 36 may be configured to standardize data string lengths so that they can be fed into the GAN for training, by padding zeros at the end of the AR coefficients up to the length of 22, as shown in FIG. 6 at (a). The zeros padded in the higher order of the AR process do not affect its performance according to the definition in Equation (1).

The AR modelling process described above is based on the assumption of wide-sense stationary signals. It requires segmentation of an entire recording from an unconstrained tool-surface interaction into multiple stationary segments before modelling. Processor 36 (FIG. 1) is configured such that each segment is labelled with the medium force and velocity during this period, and modelled as an AR model, which is stored in the Delaunay triangulation. For each texture, due to the unconstrained nature of the recording, the number of segments/AR models is uncertain. Aiming to create uniformity in the number of AR models across textures, the Delaunay triangulation for model interpolation within the texture (FIG. 6 at (b)) may be utilized. The set of force and velocity used for interpolation may be selected by clustering all the entries by a K-means algorithm after removing outliers and boundary entries, and then choosing the centroid of each cluster, as shown in FIG. 4 at (c). In some embodiments, the number of clusters may be set as 18, for example, which is the average number of segments/AR models among all the textures, without counting the entries on the boundaries.

In an embodiment, processor 36 (FIG. 1) may be configured such that the K-means algorithm may be applied on all the force and velocity entries for various surface texture datasets, which may generate a total of 18 clusters, as one example, and label each cluster with its centroid. Here processor 36 assumes that the system behaves similarly, but not exactly the same, within a cluster of force and velocity entries for given datasets. An entry of force and velocity may be randomly selected from each cluster to constitute a new set of velocities and forces for model interpolation, but still labeled with the centroids of that cluster, as shown in FIG. 6 at (c). This process may ensure the independency between examples due to the random selection in each cluster. The above process may be repeated 20 or more times, so 20 or more examples for each texture may be obtained. Considering the length and number of AR models after the zero padding and K-means clustering, there may be about 2000 examples of size 22 (length)×18 (number). Other quantities are contemplated. It should also be noted that it is valid to label the randomly selected entry from each cluster with the centroid of that cluster based on the fact that the textures in the datasets are isotropic and assumptions about the similarity of haptic feedback from similar human movements.

In FIG. 6, (a) illustrates uniforming the AR order for each force-velocity entry by zero padding; (b) illustrates uniforming the number of AR models for each texture by model interpolation via Delaunay triangulation. Black dots 600 are AR models of ABS plastic, for example, in a dataset, and dot 602 represents interpolated AR models used for training. FIG. 6 at (c) illustrates K-means clustering for the selection of force-velocity entries used for model interpolation based on all the textures datasets in a database. Different colors/patterns indicate the cluster and black crosses represent the selected force-velocity entry from each cluster.

Returning to FIG. 1, in some embodiments, processor 36 may be configured to generate new texture models from latent variables by training a deep convolutional generative adversarial network (DCGAN). In some embodiments, the network is modified from a standard DCGAN for building a network for present purposes. In some embodiments, more complicated generative models will work with an improved accuracy as well.

Figure 7:
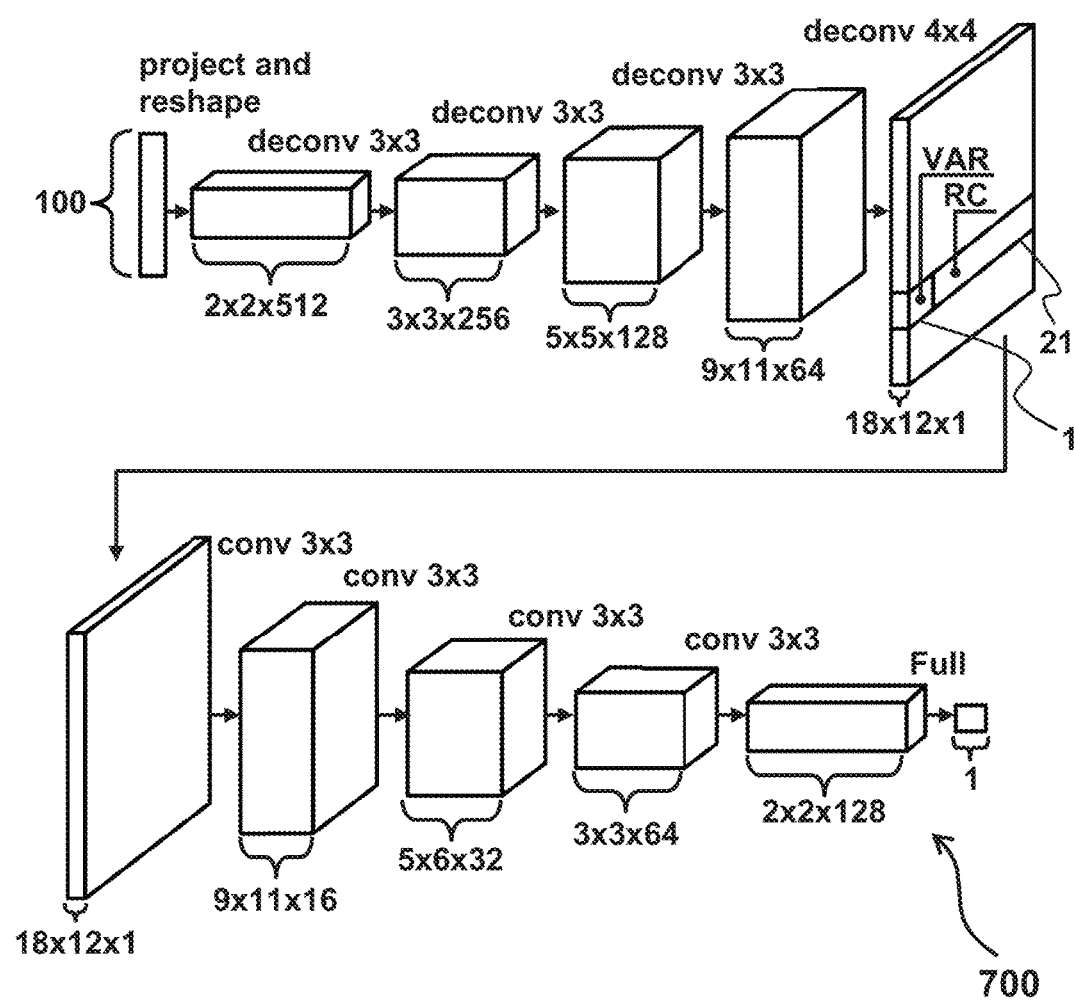
FIG. 7 illustrates an example design of the present deep convolutional generative adversarial network (DCGAN).

FIG. 7 illustrates an example design of the present DCGAN 700. DCGAN 700 comprises a group of multi-layer perceptrons (MLP) as a generator G to map the latent variables to haptic texture models, and another group of MLP as a discriminator D to judge whether a haptic texture model is perceptually realistic by training on both real and generated haptic texture models.

The MLP that forms G is the top half of FIG. 7, and the MLP that forms D is the bottom half of FIG. 7. The dimension of each cube structure is a tensor shape. FIG. 7 illustrates the network architecture and parameters of DCGAN 700 for generating haptic texture models. The tensor shapes are specified as: AR feature 1 (model number)×AR feature 2 (variance (VAR))+reflection coefficients (RC))×input channels.

Processor 36 (FIG. 1) is configured such that a training goal for D is to maximize the probability of correctly judging a haptic texture model from both real haptic texture models and generated haptic texture models. In the meantime, the network G may be trained to minimize the probability that D judges the generated haptic texture models as fake. So, D and G follow a minimax game to improve the realism of the generated haptic texture models, with the loss function L(G,D) as follows.

$$\min_G \max_D L(G, D) = \mathbb{E}_{x \sim p_y(x)}[\log D(x)] + \mathbb{E}_{z \sim p_z(z)}[\log(1 - D(G(z)))]. \quad (3)$$

In Equation 3, z are the latent variables, D(x) represents the probability that x is the real haptic texture model instead of a generated one based on the discriminator D, and G (z) represents the mapping to generated haptic texture models from the latent variable z, where $p_y$ is the distribution on a set of haptic texture models y, and $p_z$ is the prior distribution on latent variables z.

After training, the generator G can generate perceptually realistic haptic texture models by mapping from the latent variables z and the outputs can cover a similar distribution with the real haptic texture models. A person of ordinary skill in the art understands that though the outputs of the generator G have the similar distribution with real haptic texture models in the dataset, the generator G can produce many different models which do not exist in the original dataset, considering the large amount of outputs compared to the limited number of textures in the dataset.

The architecture of DCGAN 700, with a four-layer 2D convolutional generator and a four-layer 2D convolutional discriminator is shown in FIG. 7, as discussed above. The tensor shapes in FIG. 7 are specified as: AR feature 1 (model number)×AR feature 2 (variance (VAR)+reflection coefficients (RC))×input channels. Hyper-parameters may be tuned by random search. Hyper-parameters are a set of pre-defined parameters that control the learning process of the neural network (e.g. DCGAN 700 in this case)

As an example, the latent space dimension may be 100. A spectral normalization for all layers in both the DCGAN 700 (FIG. 7) generator and discriminator, except the last layer of each, may be utilized. In one embodiment, the leaky Rectified Linear Unit with $\alpha$=0.2 as the activation function for the middle layers of both generator and discriminator may be used to speed the training. For the generator, before outputting the haptic texture model, processor 36 (FIG. 1) may be configured to apply the softplus on a variance component and tanh on reflection coefficients components separately, and then concatenate them to form the final haptic texture model. Softplus is also an activation function, like the leaky Rectified Linear Unit, or the "tanh", another activation function, mentioned above. For the discriminator, the sigmoid may be used for the last layer to output a single scalar in [−1,1] which represents the probability that the haptic texture model is assigned as real.

Processor 36 (FIG. 1) may be configured such that DCGAN 700 (FIG. 7) is trained with the Adam optimizer or other algorithms. As an example, processor 36 may be configured to set a learning rate to 0.0001 for the generator and 0.0004 for the discriminator, for the purpose of balancing the convergence speeds. The mean squared error (MSE) may serve as the objective function. As an example, DCGAN may be trained with a minibatch size of 64. A minibatch is a subset of a full training dataset. DCGAN 700 may be implemented by PyTorch, and trained and validated on a computing system (such as computing system 30 shown in FIG. 1) equipped with 64 GB RAM, an Intel Xeon E5-2623v3 CPU, and a GeForce GTX Titan X with 12 GB. In this example, the training may last about two hours.

Example 1

Figure 8:
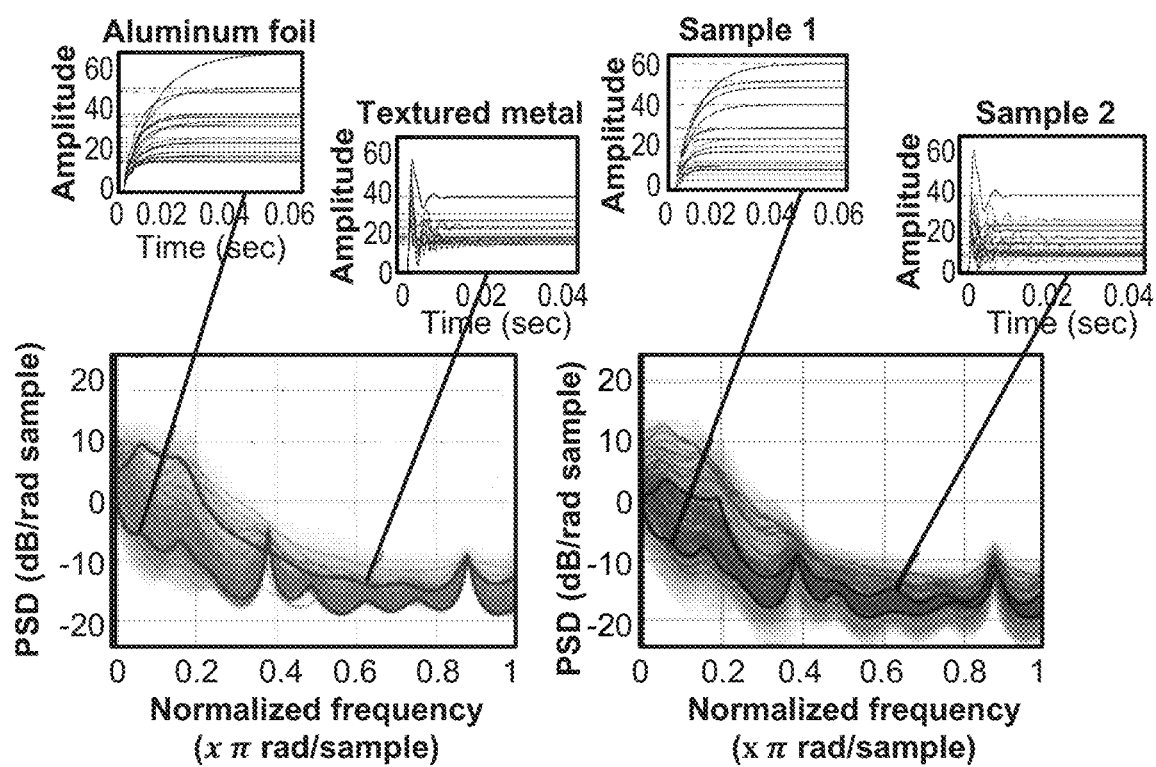
FIG. 8 illustrates Power Spectral Density (PSD) plots of a response of the texture model, and step response plots of a response of the texture model for both generated texture models by the present (trained) DCGAN and real texture models in various datasets.

Example 1 describes a qualitative analysis of the quality and capacity of DCGAN 700 (FIG. 7) described above. For the qualitative evaluation of the quality and capacity of DCGAN 700, 100 new texture models were sampled from the trained texture model generator in DCGAN 700 and the response of each motion of the sampled texture models was visualized as a Power Spectral Density (PSD) plot in FIG. 8 (right). By comparing these PSD plots with the PSD plots of the response from the real texture models in the datasets as shown in FIG. 8 (left), it may be qualitatively judged if the trained texture model generator in DCGAN 700 has the capability of covering sufficient types of textures with high quality. The callout plots in FIG. 8 show the step responses of two sampled texture models of different textured surfaces (aluminum foil and textured metal) for better comparison. The sampled texture models were then fed into the Touch/

Haptic device (20 in FIG. 2) to generate haptic feedback for a user to evaluate the authenticity of haptic feedback.

Figure 9:
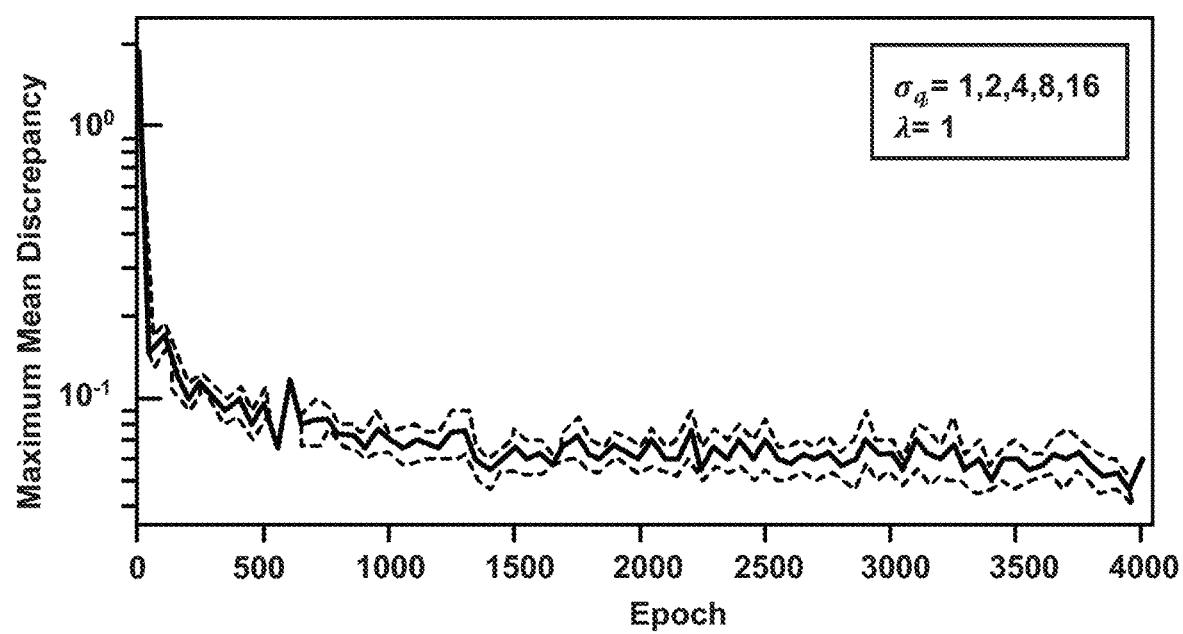
FIG. 9 is a visualization of kernel maximum mean discrepancy (MMD) between randomly selected real texture models from texture databases and generated texture models from the present (trained) DCGAN along with the training epoch.

For a stability evaluation of DCGAN 700 (FIG. 7) training, a two-sample test based on a kernel maximum mean discrepancy (MMD) was performed. FIG. 9 is a visualization of MMD between 100 randomly selected real texture models from texture databases and 100 generated texture models from the trained DCGAN 700. MMD was calculated and plotted every 50 epochs. One epoch means one pass over the full training data. It refers to an amount of data, rather than an amount of time. In FIG. 9, $\lambda$ and $\sigma_q$ stand for kernel parameters for the MMD computation.

Returning to FIG. 1 processor 36 may be configured to facilitate texture searching based on trained DCGAN 700 (FIG. 7). Based on the trained DCGAN 700 (e.g., a texture model generator), which maps the latent variables to haptic texture models, processor 36 may perform the texture search using an evolution strategy and a preference-driven texture modeling framework which combines human preferences and evolutionary texture search techniques.

To find a desired virtual texture from the texture model generator 300, processor 36 may be configured to follow a method to evolve the latent variable of the generator to the desired region in the latent space. DCGAN 700 includes a generator and a discriminator, and both generator and discriminator are trained together based on a set of texture models during the training phase. After the training phase, only the generator (e.g., texture model generator 300 described above) in DCGAN 700 is used to generate new texture models. Many standard optimization methods, either gradient-based or gradient-free algorithms, are capable of searching a space with the assumption that the underlying space is a continuous and smooth manifold, and the optimization function is well-behaved. In this case, however, the evaluation of the latent variable from the DCGAN is discontinuous and rugged since it is hard to find an explicit fitness function to perceptually evaluate a texture, so evolutionary algorithms are used to search the latent space.

As an example, the Covariance Matrix Adaptation Evolution Strategy (CMA-ES) may be used by processor 36 to evolve the latent variables (similar success has been achieved in latent variable evolution in the image domain and desired abilities of conducting black box optimization in a rough and rugged manifold). To find the target in a latent space, CMA-ES first generates new latent variables by sampling a normal distribution, and orders them in terms of their objective fitness. Based on the order, CMA-ES moves the mean and updates the covariance matrix of the normal distribution from which new latent variables are resampled. It repeats until the generated latent variable reaches the goal.

Due to the nature of textures, it is difficult to explicitly define the objective fitness function in this domain. An objective fitness function is the function used to evaluate the quality of a target, e.g. texture in this case, based on a certain standard. In other words, it may be challenging to compute how good a generated texture is or rank a set of textures following a specific standard about texture. Thus, processor 36 is configured such that subjective criteria such as human preference is used to replace the objective fitness function in the ordering step in CMA-ES. Replacing the ordering step based on objective fitness with the human preference does not change the whole procedure defined by the algorithm and provides users the interactivity to actively manipulate the search.

An example algorithm is provided below:

---
Algorithm 1 Interactive Texture Search by CMA-ES
---

Input: The mean vector $m \in R^n$ which represents the favorite solution, the step-size $\sigma \in R_+$ which controls the step length, and the number of candidates $\lambda$.
Initialize: The covariance matrix $C = I \in R^{n \times n}$, which controls the shape of the distribution.
1: repeat
2: $z_i = m + \sigma y_i$, $y_i \sim \mathcal{N}_i(O, C)$, $i = 1, \ldots, \lambda$ ▷sampling
3: textures $\leftarrow G_\theta(z)$ ▷generate texture candidates
4: interface.render(textures)
5: wait until interface.selectButtonPressed(idx) True
6: selection $\leftarrow z_{idx}$
7: Update m by moving to the selection
8: Adapt C and $\sigma$ by rank-one update
9: until user stops

---

Algorithm 1 shows the details of the interactive texture search in the latent space by CMA-ES. From an initialized normal distribution having the same dimension as the latent space, sample $\lambda$ latent variables (line 2). The latent variables are passed through the trained texture model generator (DCGAN 700 shown in FIG. 7) to produce texture models (line 3) and render the textures via a haptic interface (line 4). After touching all the textures with a haptic device by the interface, users select the texture perceptually closest to the given real texture (line 5). Processor 36 may be configured such that the selection will cause an update to the mean of the distribution to maximize the probability of selected samples (line 7) and adapt the covariance of the distribution to increase the probability of previous search steps (line 8). A new set of latent variables may be chosen based on the updated normal distribution. This procedure continues until users think the selected texture is close enough to the real texture.

Figure 10:
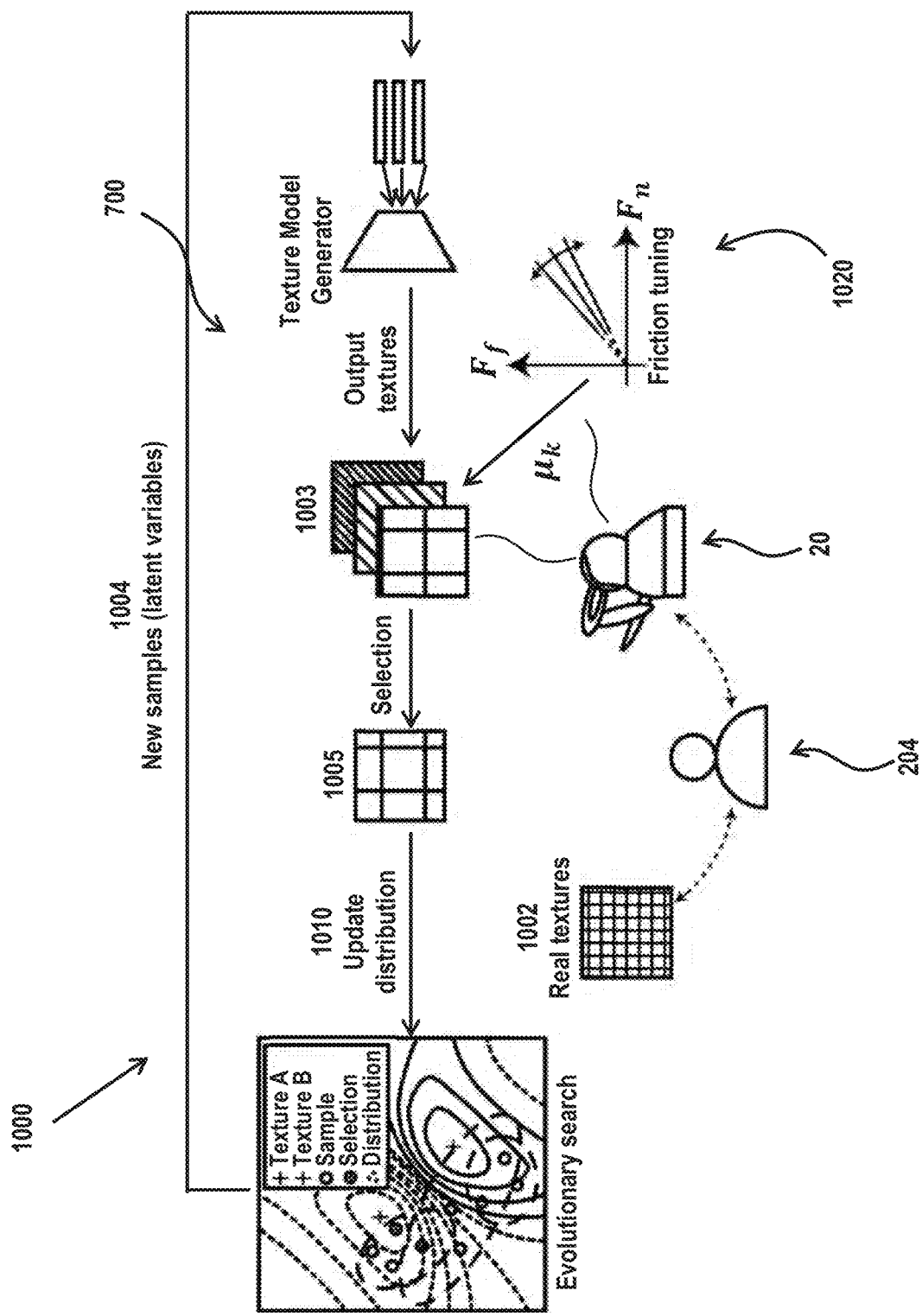
FIG. 10 illustrates a preference-driven texture modeling framework.

FIG. 10 illustrates a preference-driven texture modeling framework 1000. Processor 36 (FIG. 1) may be configured to facilitate preference-driven texture modeling framework 1000. For example, combining the generator (e.g., DCGAN 700 trained on texture datasets) and the evolutionary algorithm CMA-ES to evolve the latent variable of the generator, processor 36 and/or system 10 provides preference-driven texture modeling framework 1000. A difference between preference-driven texture modeling framework 1000 and data-driven texture modeling is the criteria for modeling a target texture. In data-driven texture modeling methods, the criteria for modeling a texture is the recorded acceleration signals while there is no recording step in the preference-driven methods. In the present disclosure, to model a texture, a user's subjective preference is employed as the criteria.

The combination of generative adversarial networks and interactive evolutionary algorithms allows DCGAN 700 to bound the search space and the evolution strategy to guide the search by human preference. The GAN-based texture model generator DCGAN 700 is trained over a realistic texture dataset (e.g., as described above), which ensures the realism and diversity of generated samples thus provides a constrained search space for the evolutionary algorithm (e.g., Algorithm 1 shown above). DCGAN 700 starts with transforming a set of latent variables sampled from a normal distribution into the autoregressive texture models which have an interactivity of tool states. This interactivity allows user 204 to interact with the generated textures in an unconstrained manner and then select the closet texture compared to the given real texture. The selection relies on the user's preference from the interaction with the textures. Based on the selection, the interactive evolutionary algorithm updates the distribution from which to resample the latent variables, to increase the likelihood of selected textures and previous search steps.

As shown in FIG. 10, a user 204 may interact with real textures 1002 and virtual texture candidates 1003 which are generated from the latent variables 1004 by the texture model generator (DCGAN 700), using a customized tool/haptic device 20 respectively. Based on their preference, user 204 may select the virtual texture 1005 haptically closet to the real texture. Processor 36 may be configured such that the evolutionary algorithm (e.g., Algorithm 1 described above) will update the distribution 1010 where new latent variables are sampled. The new sampled latent variables are passed back to the texture model generator to output new texture candidates. In the meantime, user 204 can adjust 1020 the texture friction to match the actual resistance. This process continues until user 204 thinks a final selected texture feels haptically close enough to the real texture.

Example 2

As an example of system 10 (FIG. 1) evaluation, a human-subject study was conducted for determining the effectiveness and efficiency of the present preference-driven texture generation and search system 10, and to evaluate the quality of generated textures from both objective and subjective comparisons with references of real textures and virtual textures modelled by a data-driven method. The study was divided into two phases—texture generation and search, and texture evaluation, with two separate sets of subjects.

A. User Interface and Set-Up

Figure 11:
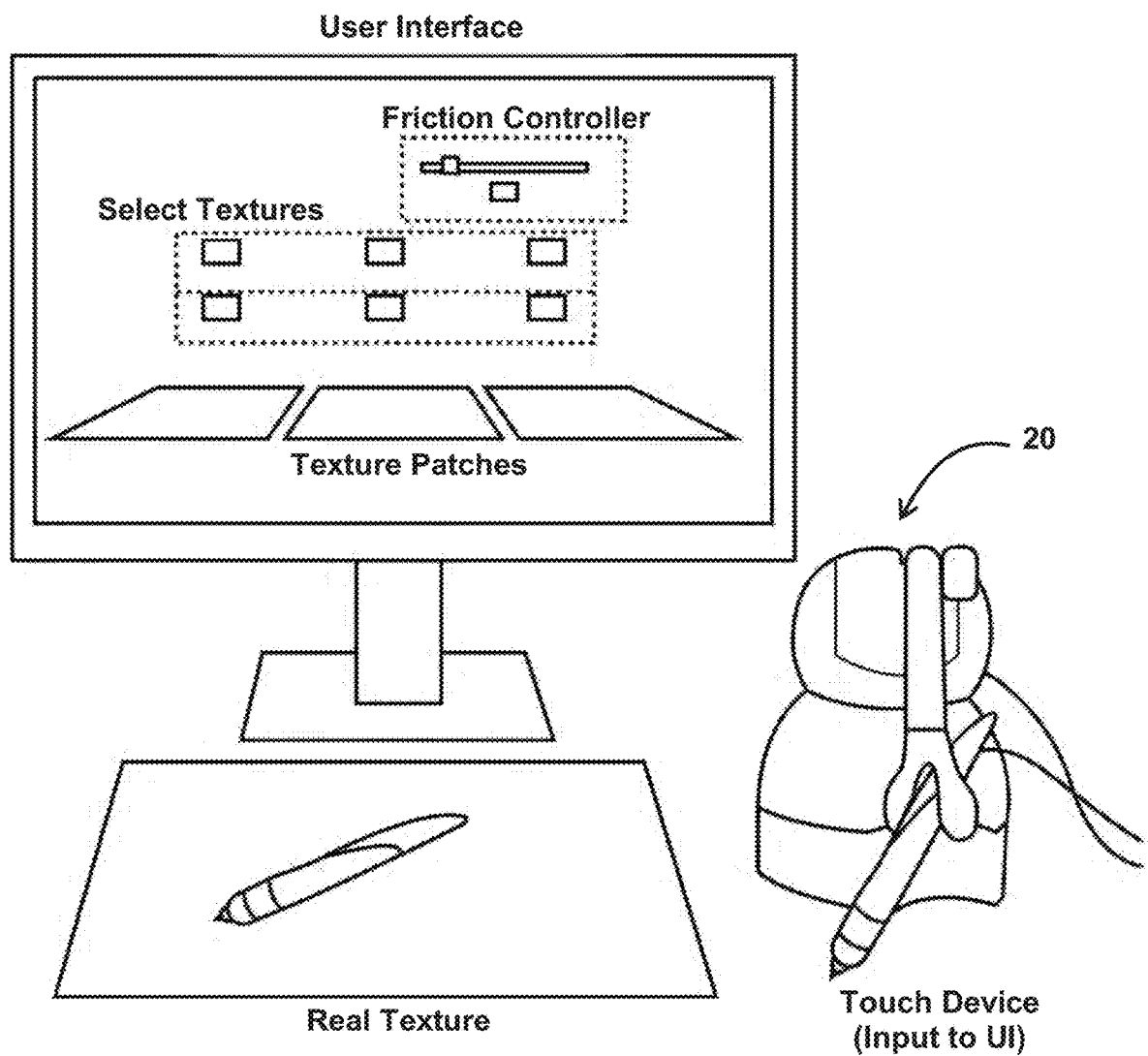
FIG. 11 illustrates a simulation platform for a haptic interface, and experimental setup for testing the present system.
Figure 12:
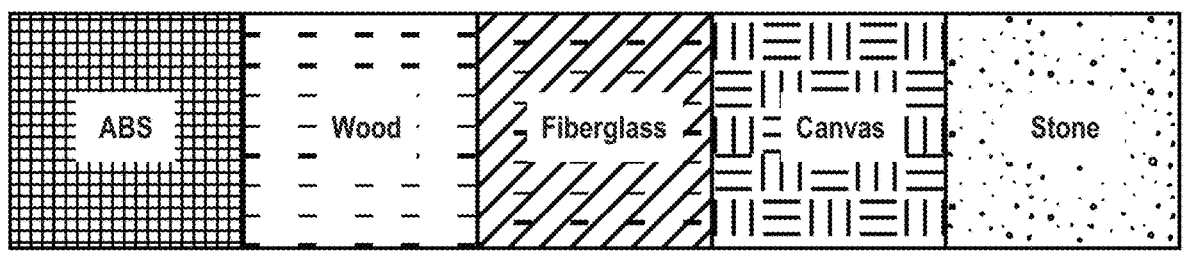
FIG. 12 illustrates five different examples of real textures of surfaces.

A simulation platform in C++ was created as a main haptic interface, binding with Python blocks for texture generation and search, as shown in FIG. 11. For this example, the interface included three "select" buttons and "save" buttons for three texture patches correspondingly, and a slider for controlling the friction of all of the texture patches. Users interacted with the interface by moving the stylus of a 3D touch device (e.g., device 20 in FIG. 2). The haptic feedback for textures was delivered to users based on their motion in real time by an MM3C Haptuator (TactileLabs) attached on the tip of the stylus. The real texture was placed next to the 3D touch device so that users touched it using a tool with the same grip as the stylus, but a custom 3D-printed tip in a way closest to how users touched virtual textures in the simulation. In some embodiments, the simulation environment may comprise only one texture patch at a time, and users may touch the texture patch using the 3D touch device.

B. Experiment Procedure

A user was seated at a table with an arm held above the table. For simulation, the user held the stylus of the touch device and moved it on the virtual texture patches in any way they wanted, but tapping and pressing were not allowed. They also interacted with all the user interface components by using the stylus. For real textures, the user touched them using the tool described above with the same motion constraints as that for virtual textures. During the study, users were asked to wear headphones playing white noise to block auditory feedback. The experiments were separated into two phases and recruited two separate groups of subjects for each phase.

Phase 1—Texture generation and search driven by user preference: in Phase 1, users were asked to select one virtual texture out of three which felt closest to a given real texture for multiple rounds. Users could also adjust the friction of textures using the slider. After the user selected the texture or adjusted the friction, all three texture candidates were updated, with either new generated textures or changed resistance, based on a user's actions. The user could then save the texture candidate that they thought was close to the real texture. This process continued until the user thought the final saved texture felt close enough to the real texture. For each real texture, the final saved virtual texture models were used in the evaluation phase. Five different real textures, shown in FIG. 12 (e.g., ABS, wood, fiberglass, canvas, and stone), were presented for users so they could search for the closest virtual textures according to the approach described above. Note that data corresponding to these five textures was not provided to DCGAN 700 (FIG. 7) for training.

Phase 2—Texture evaluation: in Phase 2, another set of users was asked to touch the (a) final five virtual textures which were saved in Phase 1, their corresponding (b) real textures, and (c) virtual textures modelled by a data-driven method in a random order. First, users were asked to rate the perceptual dimensions of each sample, including roughness, hardness, and slipperiness. Second, a similarity comparison was conducted among these three categories to test the hypotheses as follows: (1) the saved virtual texture from Phase 1 felt close to the corresponding real texture; (2) the saved virtual texture from Phase 1 represented the corresponding real texture equal to or better than the virtual texture modelled by the data-driven method. The order of the ratings and similarity comparisons was randomized to eliminate order effects.

Figure 13:
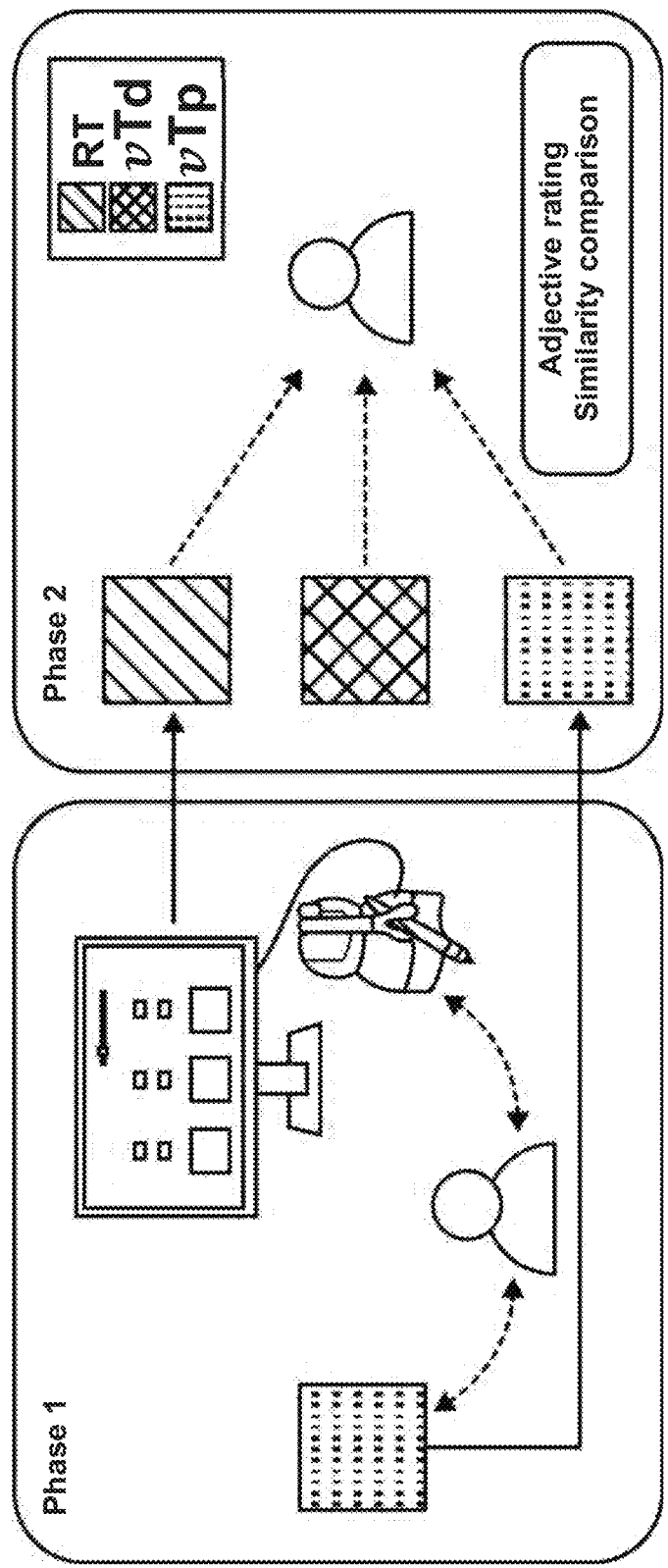
FIG. 13 is a schematic illustration of the experimental procedures of Phase 1—texture generation and search, and Phase 2—texture evaluation of a human-subject study conducted for determining the effectiveness and efficiency of the present preference-driven texture generation and search system, and to evaluate the quality of generated textures from both objective and subjective comparisons with references of real textures and virtual textures modelled by a data-driven method.

FIG. 13 is a schematic illustration of the experimental procedures of Phase 1 and Phase 2. RT is the real texture, VTd is the virtual texture by data-driven method, and VTp is the virtual texture by the present preference-driven method. Evaluation metrics and results of Phase 1 were shown in FIG. 14.

C. Results

Spectral Difference Analysis: spectral difference analysis was used to compare the vibration signals from preference-driven textures, data-driven textures, and real textures using a metric associated with a frequency spectrum. Since vibration signals depend on the actual force and speed of motion, a pre-defined force-speed trajectory may be used for all three types of textures. As an example, ten-second signals may be collected from each texture in three categories and computed the spectrum using a window of a certain time, that overlaps with other windows.

Subjective Analysis: to further evaluate the generated textures by the interactive texture design system 10 (FIG. 1), users' responses were analyzed from adjective ratings and similarity comparisons. For adjective ratings, a two-way ANOVA was performed for each texture on the roughness, hardness, and slipperiness individually using subject, texture type as factors.

D. Discussion

Previous work on texture generative models mainly focuses on the interactivity of texture's attributes such as generating the frequency spectrum of the acceleration, so it is closer to the generation of a "static texture" which is equivalent to an image in vision. Instead, the present systems and methods focus on the interactivity of a tool's state, and recreate the "texture model" which can generate instantaneous acceleration signals, so that the properties from the texture model may be retained and used to realize a real-time texture rendering based on a user's motion. Thus, a set of models which can generate a "dynamic texture", may be created. This shift of the focus gives users full freedom of interacting with the texture in the way they desire, rather than constrains users to follow certain motion paths and velocities. This is significant in the system since the interactive search method for a target texture relies on a user's preferences. Giving users full freedom on interacting with the texture can ensure the authenticity of the real-time haptic perception and then maximize the effectiveness of the texture search.

Returning to FIG. 1, in some embodiments, processor 36 is configured to cause haptic feedback to be provided to a user. For example, a user may request haptic feedback indicative of a specific material surface (e.g., carpet or some other texture). Processor 36 may be configured to control device 20 or some other haptic feedback device for the user based on the trained texture model generator and the texture search, to output the requested haptic feedback.

User interface 32 is configured to provide an interface between system 10 and users through which users may provide information to and receive information from system 10. This enables data, results, and/or instructions, and any other communicable items, collectively referred to as "information," to be communicated between the users and one or more of device 20, processor 36, computing device 30, external resources 40, and/or other components. Examples of interface devices suitable for inclusion in user interface 32 include a keypad, buttons, switches, a keyboard, knobs, levers, a display screen, a touch screen, speakers, a microphone, an indicator light, an audible alarm, a printer, and/or other interface devices. In one embodiment, user interface 32 includes a plurality of separate interfaces (e.g., an interface on device 20, an interface in computing system 30, etc.). In one embodiment, user interface 32 includes at least one interface that is provided integrally with processor 36.

It is to be understood that other communication techniques, either hard-wired or wireless, are also contemplated by the present disclosure as user interface 32. Other exemplary input devices and techniques adapted for use with system 10 as user interface 32 include, but are not limited to, an RS-232 port, RF link, an IR link, modem (telephone, cable or other). In short, any technique for communicating information with system 10 is contemplated by the present disclosure as user interface 32.

Electronic storage 38 comprises electronic storage media that electronically stores information. The electronic storage media of electronic storage 38 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 38 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 38 may store software algorithms, information determined by processor 36, information received via user interface 32, and/or other information that enables system 10 to function properly. Electronic storage 38 may be (in whole or in part) a separate component within system 10, or electronic storage 38 may be provided (in whole or in part) integrally with one or more other components of system 10 (e.g., computing system 30, processor 36, etc.).

External resources 40 include sources of information such as databases, websites, etc.; external entities participating with system 10 (e.g., systems or networks associated with system 10), one or more servers outside of the system 10, a network (e.g., the internet), electronic storage, equipment related to Wi-Fi™ technology, equipment related to Bluetooth® technology, data entry devices, or other resources. In some implementations, some or all of the functionality attributed to external resources 40 may be provided by resources included in system 10. External resources 40 may be configured to communicate with device 20, processor 36, computing system 30, and/or other components of system 10 via wired and/or wireless connections, via a network (e.g., a local area network and/or the internet), via cellular technology, via Wi-Fi technology, and/or via other resources.

Network 50 may include the internet, a Wi-Fi network, Bluetooth® technology, and/or other wireless technology.

Figure 15:
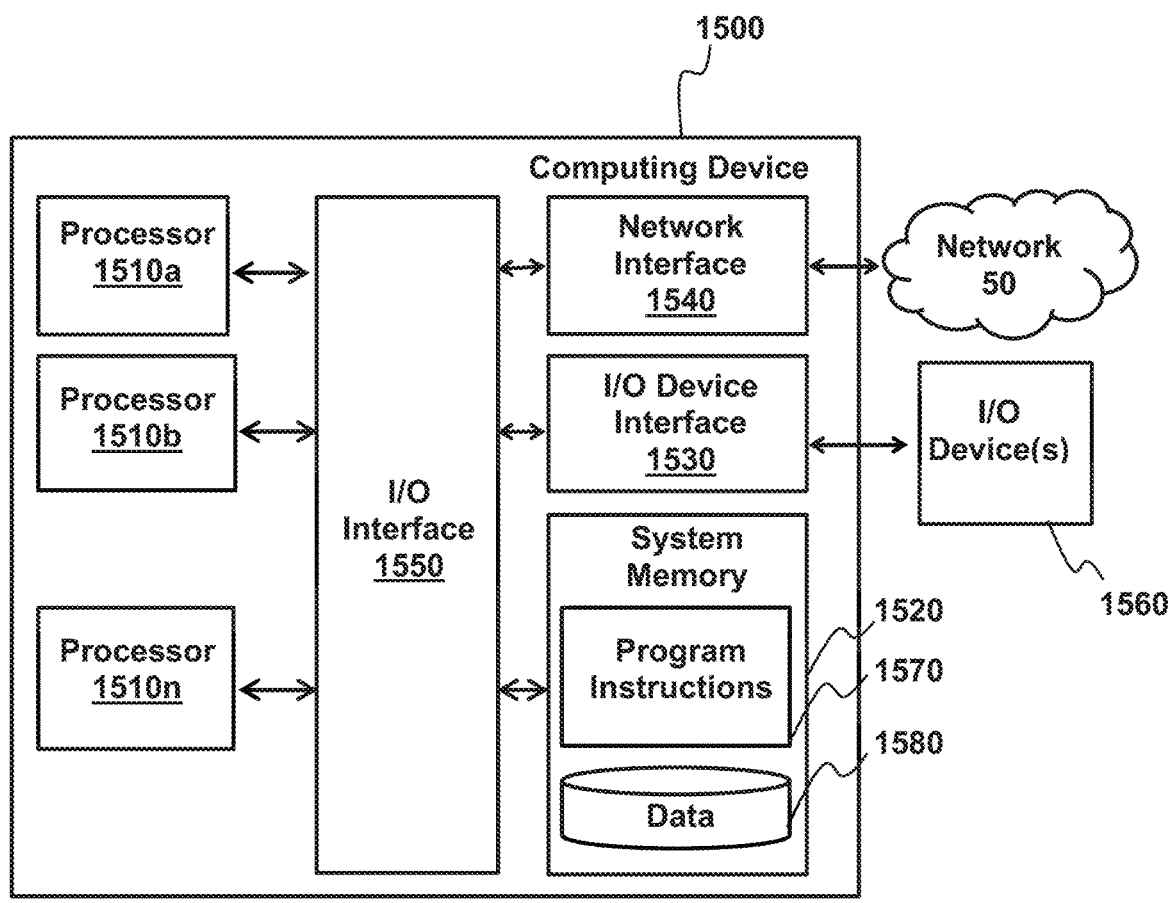
FIG. 15 illustrates an example computer system that may be configured for performing one or more of the operation described.

FIG. 15 is a diagram that illustrates an exemplary computing device 1500 (similar to and/or the same as computing system 30 described above) in accordance with embodiments of the present system. Various portions of systems and methods described herein, may include, or be executed on one or more computing devices the same as or similar to computing device 1500. For example, processor 36 of system 10 (FIG. 1) may be and/or be included in one more computing devices the same as or similar to computing device 1500. Further, processes, modules, processor components, and/or other components of system 10 may be executed by one or more processing systems similar to and/or the same as that of computing device 1500.

Computing device 1500 may include one or more processors (e.g., processors 1510a-1510n, which may be similar to and or the same as processor 36) coupled to system memory 1520 (which may be similar to and/or the same as electronic storage 38), an input/output I/O device interface 1530, and a network interface 1540 via an input/output (I/O) interface 1550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing device 1500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1520). Computing device 1500 may be a uni-processor system including one processor (e.g., processor 1510a), or a multi-processor system including any number of suitable processors (e.g., 1510a-1510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing device 1500 may include a plurality of computing devices (e.g., distributed computer systems) to implement various processing functions.

I/O device interface 1530 may provide an interface for connection of one or more I/O devices 1560 to computer device 1500. I/O devices may include devices that receive input (e.g., from a user) or output information (e.g., to a user). I/O devices 1560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1560 may be connected to computing device 1500 through a wired or wireless connection. I/O devices 1560 may be connected to computing device 1500 from a remote location. I/O devices 1560 located on remote computer system, for example, may be connected to computing device 1500 via a network and network interface 1540.

Network interface 1540 may include a network adapter that provides for connection of computing device 1500 to a network. Network interface 1540 may facilitate data exchange between computing device 1500 and other devices connected to the network (e.g., network 50 shown in FIG. 1). Network interface 1540 may support wired or wireless communication. The network may include an electronic communication network, such as the Internet, a local area network (LAN), a wide area network (WAN), a cellular communications network, or the like.

System memory 1520 may be configured to store program instructions 1570 or data 1580. Program instructions 1570 may be executable by a processor (e.g., one or more of processors 1510a-1510n) to implement one or more embodiments of the present techniques. Instructions 1570 may include modules and/or components of computer program instructions for implementing one or more techniques described herein with regard to various processing modules and/or components. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1520 may include a non-transitory computer readable storage medium that may have program instructions stored thereon that are executable by a computer processor (e.g., one or more of processors 1510a-1510n) to cause the subject matter and the functional operations described herein. A memory (e.g., system memory 1520) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1550 may be configured to coordinate I/O traffic between processors 1510a-1510n, system memory 1520, network interface 1540, I/O devices 1560, and/or other peripheral devices. I/O interface 1550 may perform protocol, timing, or other data transformations to convert data signals from one component (e.g., system memory 1520) into a format suitable for use by another component (e.g., processors 1510a-1510n). I/O interface 1550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing device 1500 or multiple computing devices 1500 configured to host different portions or instances of embodiments. Multiple computing devices 1500 may provide for parallel or sequential processing/execution of one or more portions of the techniques described herein.

Those skilled in the art will appreciate that computing device 1500 is merely illustrative and is not intended to limit the scope of the techniques described herein. Computing device 1500 may include any combination of devices or software that may perform or otherwise provide for the performance of the techniques described herein. For example, computing device 1500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing device 1500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing device 1500 may be transmitted to computing device 1500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

Figure 16:
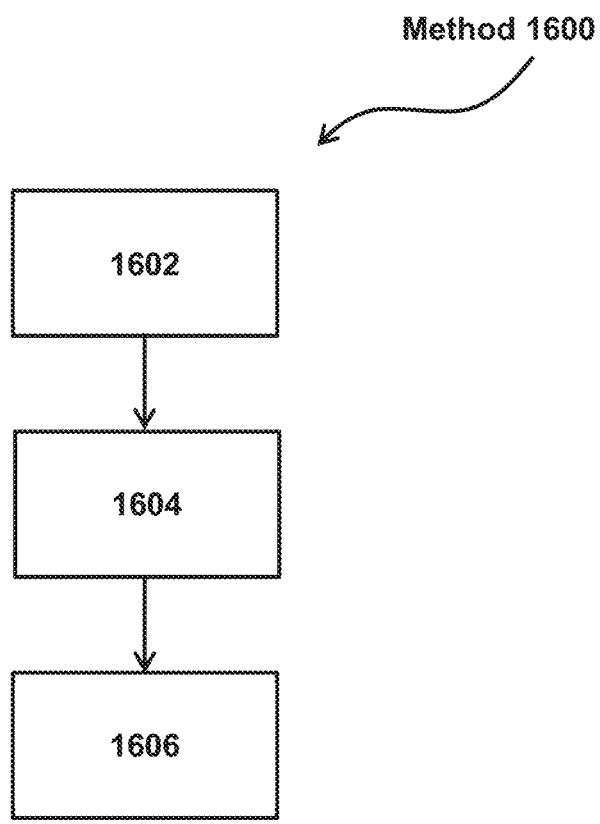
FIG. 16 illustrates a method associated with an embodiment of the present system.

FIG. 16 illustrates a method 1600 for interactive human preference-driven virtual texture generation and search, and haptic feedback. The operations of method 1600 presented below are intended to be illustrative. In some embodiments, method 1600 may be accomplished with one or more additional operations not described, and/or without one or more of the operations discussed. Additionally, the order in which the operations of method 1600 are illustrated in FIG. 16 and described below is not intended to be limiting.

In some embodiments, method 1600 may be implemented in one or more processing devices (e.g., a digital processor, an analog processor, a digital circuit designed to process information, an analog circuit designed to process information, a state machine, and/or other mechanisms for electronically processing information). The one or more processing devices (e.g., processor 36 (FIG. 1), processor 1510a (FIG. 15), etc., described herein) may include one or more devices executing some or all of the operations of method 1600 in response to instructions stored electronically on an electronic storage medium (e.g., electronic storage 38 (FIG. 1), system memory 1520 (FIG. 15), etc.). The one or more processing devices may include one or more devices configured through hardware, firmware, and/or software to be specifically designed for execution of one or more of the operations of method 1600.

At an operation 1602, a texture model generator is trained. The training may be based on training data associated with textures of materials. The texture model generator may be trained to map a set of latent variables to texture models. The texture model generator may be a deep convolutional generative adversarial network (DCGAN). The DCGAN may include a first group of multi-layer perceptrons as a generator G to map the set of latent variables to the texture models, and a second group of multi-layer perceptrons as a discriminator D to judge whether the texture model generated by the generator G is real based on a comparison with a reference texture model. The training of the texture model generator may comprise: obtaining the training data comprising: (i) the textures for different category of materials, (ii) friction data associated with the textures, and (iii) haptic texture data associated with the textures; and training, based on the training data, the texture model generator based on the DCGAN to cause the generator G to generate texture models perceptually similar to real textures of the materials. In some embodiments, the friction data is generated by a friction model configured to allow a user to tune friction coefficients based on user perceived resistance of a texture via a user interface. In some embodiments, the friction data is determined from the normal and tangential forces of movement based on a Coulomb friction model. The haptic texture data comprises at least one of: reflection coefficients corresponding to texture roughness of the textures, velocities and forces of movements performed by the user on a particular texture via a user interface, texture roughness data associated with the textures, or autoregressive coefficients that model the texture roughness of the textures. In some embodiments, operation 1602 is performed by or with a processor similar to and/or the same as processor 36 (shown in FIG. 1 and described above). In some embodiments, the texture model may be stored by electronic storage the same as or similar to electronic storage 38 (shown in FIG. 1 and described above), for example.

At an operation 1604, a texture search is performed. The search may be performed via the texture model generator, using an interactive evolutionary algorithm configured to search a desired texture through evolving latent variables to a desired region in a latent space driven by a user preference. The texture search comprises: evolving of the latent variables associated with the texture model generator using a Covariance Matrix Adaptation Evolution Strategy (CMA-ES). In some embodiments, the texture search comprises sampling a first set of latent variables from a normal distribution having same dimension as the latent space of the texture model generator; inputting the first set of latent variables to the texture model generator to generate one or more texture models; rendering the one or more texture models via an haptic user interface to allow users to touch the one or more texture models; receiving a user selection of a texture model from the one or more texture models, the user selected texture model being closed to a given real texture; updating, based on the user selected texture model, the mean of the normal distribution; adapting the covariance of the normal distribution to increase a probability of the texture search; and sampling a second set of latent variables using the updated normal distribution and performing above steps until the user is satisfied that the selected texture model is close enough to the given real texture. In some embodiments, operation 1604 is performed by or with a processor similar to and/or the same as processor 36 (shown in FIG. 1 and described above).

At an operation 1606, haptic feedback may be provided. For example, a user may request haptic feedback indicative of a specific material surface (e.g., carpet or some other texture). Operation 1606 may comprise controlling a haptic feedback device for the user based on the trained texture model generator and the texture search, to output the requested haptic feedback. In some embodiments, operation 1606 is performed by a processor the same as or similar to processor 36 or a touch/haptic device the same as or similar to touch/haptic device 20 (shown in FIG. 1 and described above.)

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A system comprising:
 a motorized touch device configured to apply haptic force and tactile feedback on a hand, allowing users to feel virtual objects and touch sensations;
 at least one programmable processor; and
 a non-transitory machine-readable medium storing instructions which, when executed by the at least one programmable processor, cause the at least one programmable processor to perform operations comprising:
  training, based on training data associated with textures of materials, a texture model generator to map a set of latent variables in a latent space to haptic texture models; and
  performing, via the texture model generator, a texture search by an algorithm configured to search a desired virtual texture through evolving latent variables in a desired region in the latent space, such that the virtual texture can be provided to a user with the motorized touch device.

2. The system of claim 1, wherein the texture search comprises: evolving of the latent variables associated with the texture model generator using a Covariance Matrix Adaptation Evolution Strategy (CMA-ES).

3. A system comprising:
a motorized touch device configured to apply haptic force and tactile feedback on a hand, allowing users to feel virtual objects and touch sensations;
at least one programmable processor; and
a non-transitory machine-readable medium storing instructions which, when executed by the at least one programmable processor, cause the at least one programmable processor to perform operations comprising:
training, based on training data associated with textures of materials, a texture model generator to map a set of latent variables to haptic texture models; and
performing, via the texture model generator, a texture search by an algorithm configured to search a desired virtual texture through evolving latent variables in a desired region in a latent space, such that the virtual texture can be provided to a user with the motorized touch device,
wherein the texture model generator is a deep convolutional generative adversarial network (DCGAN), and
wherein the DCGAN includes a first group of multi-layer perceptrons as a generator G to map a set of the latent variables to the texture models, and a second group of multi-layer perceptrons as a discriminator D to judge whether a texture model generated by the generator G is real based on a comparison with a reference texture model.

4. The system of claim 3, wherein the training of the texture model generator comprises:
obtaining training data comprising: (i) physical textures for different categories of materials, (ii) friction data associated with the physical textures, and (iii) haptic texture data associated with the physical textures; and
training, based on the training data, the texture model generator based on a DCGAN algorithm to cause the generator G to generate texture models perceptually similar to the physical textures of the categories of materials.

5. The system of claim 4, wherein the friction data is determined from normal and tangential forces of movement based on a Coulomb friction model, and/or generated by a friction model configured to allow a user to tune friction coefficients based on a user's perceived resistance of a given physical texture via a user interface.

6. The system of claim 5, wherein a haptic texture model comprises at least one of: reflection coefficients corresponding to texture roughness of the physical textures, velocities and forces of movements performed by the user on a particular physical texture via a user interface, texture roughness data associated with the physical textures, or autoregressive coefficients that model a texture roughness of the physical textures.

7. A system comprising:
a motorized touch device configured to apply haptic force and tactile feedback on a hand, allowing users to feel virtual objects and touch sensations;
at least one programmable processor; and
a non-transitory machine-readable medium storing instructions which, when executed by the at least one programmable processor, cause the at least one programmable processor to perform operations comprising:
training, based on training data associated with textures of materials, a texture model generator to map a set of latent variables to haptic texture models; and
performing, via the texture model generator, a texture search by an algorithm configured to search a desired virtual texture through evolving latent variables in a desired region in a latent space, such that the virtual texture can be provided to a user with the motorized touch device,
wherein the texture search comprises: evolving of the latent variables associated with the texture model generator using a Covariance Matrix Adaptation Evolution Strategy (CMA-ES), and
wherein the texture search for a given real texture comprises:
a. sampling a first set of latent variables from a normal distribution having a same dimensionality as the latent space of the texture model generator;
b. inputting the first set of latent variables to the texture model generator to generate one or more texture models;
c. rendering the one or more texture models via a haptic user interface comprising the touch device to allow users to touch the one or more texture models;
d. receiving user selection of a texture model from the one or more texture models, the user selected texture model being closest to a given real texture;
e. updating, based on the user selected texture model, a mean of the normal distribution;
f. adapting a covariance of the normal distribution to increase a speed of the texture search;
g. sampling a second set of latent variables using an updated normal distribution and performing steps a-f until the user is satisfied that the selected texture model is sufficiently close to the given real texture; and
h. tuning a friction coefficient of a Coulomb friction model for a virtual texture based on a user's preference to match a perceived resistance of the given real texture.

8. A non-transitory computer-readable medium comprising instructions stored therein that, when executed by one or more processors, cause operations comprising:
training, based on training data associated with textures of materials, a texture model generator to map a set of latent variables in a latent space to texture models; and
performing, via the texture model generator, a texture search by an algorithm configured to search a desired texture through evolving latent variables to a desired region in the latent space.

9. The medium of claim 8, wherein the texture search comprises: evolving of the latent variables associated with the texture model generator using a Covariance Matrix Adaptation Evolution Strategy (CMA-ES).

10. A non-transitory computer-readable medium comprising instructions stored therein that, when executed by one or more processors, cause operations comprising:
training, based on training data associated with textures of materials, a texture model generator to map a set of latent variables to texture models; and
performing, via the texture model generator, a texture search by an algorithm configured to search a desired texture through evolving latent variables to a desired region in a latent space,
wherein the texture model generator is a deep convolutional generative adversarial network (DCGAN), and
wherein the DCGAN includes a first group of multi-layer perceptrons as a generator G to map the set of the latent variables to the texture models, and a second group of multi-layer perceptrons as a discriminator D to judge whether the texture model generated by the generator G is accurate based on a comparison with a reference texture model.

11. The medium of claim 10, wherein the training of the texture model generator comprises:
   obtaining training data comprising: (i) textures for different categories of materials, (ii) friction data associated with the textures, and (iii) haptic texture data associated with the textures; and
   training, based on the training data, the texture model generator based on a DCGAN algorithm to cause the generator G to generate texture models perceptually similar to real textures of the categories of materials.

12. The medium of claim 11, wherein the friction data is determined from normal and tangential forces of movement based on a Coulomb friction model, and/or generated by a friction model configured to allow a user to tune friction coefficients based on a user's perceived resistance of a given physical texture via a user interface.

13. The medium of claim 11, wherein the haptic texture data comprises at least one of: reflection coefficients corresponding to texture roughness of the textures, velocities and forces of movements performed by a user on a particular texture via a user interface, texture roughness data associated with the textures, or autoregressive coefficients that model the texture roughness of the textures.

14. A non-transitory computer-readable medium comprising instructions stored therein that, when executed by one or more processors, cause operations comprising:
   training, based on training data associated with textures of materials, a texture model generator to map a set of latent variables to texture models; and
   performing, via the texture model generator, a texture search by an algorithm configured to search a desired texture through evolving latent variables to a desired region in a latent space,
   wherein the texture search comprises: evolving of the latent variables associated with the texture model generator using a Covariance Matrix Adaptation Evolutoin Strategy (CMA-ES), and
   wherein the texture search comprises:
   a. sampling a first set of latent variables from a normal distribution having a same dimensionality as the latent space of the texture model generator;
   b. inputting the first set of latent variables to the texture model generator to generate one or more texture models;
   c. rendering the one or more texture models via a haptic user interface to allow users to touch the one or more texture models;
   d. receiving a user selection of a texture model from the one or more texture models, the user selected texture model being closest to a given real texture;
   e. updating, based on the user selected texture model, a mean of the normal distribution;
   f. adapting a covariance of the normal distribution to increase a probability of the texture search returning an accurate result;
   g. sampling a second set of latent variables using an updated normal distribution; and
   h. performing steps a-g until a user is satisfied that the selected texture model is sufficiently close to the given real texture.

15. A method comprising:
   training, based on training data associated with textures of materials, a texture model generator to map a set of latent variables in a latent space to texture models; and
   performing, via the texture model generator, a texture search by an algorithm configured to search a desired texture through evolving latent variables to a desired region in the latent space.

16. The method of claim 15, wherein the texture search comprises: evolving of the latent variables associated with the texture model generator using a Covariance Matrix Adaptation Evolution Strategy (CMA-ES).

17. A method comprising:
   training, based on training data associated with textures of materials, a texture model generator to map a set of latent variables to texture models; and
   performing, via the texture model generator, a texture search by an algorithm configured to search a desired texture through evolving latent variables to a desired region in a latent space,
   wherein the texture model generator is a deep convolutional generative adversarial network (DCGAN), and
   wherein the DCGAN includes a first group of multi-layer perceptrons as a generator G to map the set of latent variables to the texture models, and a second group of multi-layer perceptrons as a discriminator D to determine whether a texture model generated by the generator G is accurate based on a comparison with a reference texture model.

18. The method of claim 17, wherein the training of the texture model generator comprises:
   obtaining training data comprising: (i) textures for different categories of materials, (ii) friction data associated with the textures, and (iii) haptic texture data associated with the textures; and
   training, based on the training data, the texture model generator based on a DCGAN algorithm to cause the generator G to generate texture models perceptually similar to real textures of the materials.

19. The method of claim 18, wherein the friction data is determined from normal and tangential forces of movement based on a Coulomb friction model, and/or generated by a friction model configured to allow a user to tune friction coefficients based on a user's perceived resistance of a given physical texture via a user interface.

20. The method of claim 18, wherein the haptic texture data comprises at least one of: reflection coefficients corresponding to texture roughness of the textures, velocities and forces of movements performed by a user on a particular texture via a user interface, texture roughness data associated with the textures, or autoregressive coefficients that model the texture roughness of the textures.

21. A method comprising:
   training, based on training data associated with textures of materials, a texture model generator to map a set of latent variables to texture models; and
   performing, via the texture model generator, a texture search by an algorithm configured to search a desired texture through evolving latent variables to a desired region in a latent space,
   wherein the texture search comprises: evolving of the latent variables associated with the texture model generator using a Covariance Matrix Adaptation Evolution Strategy (CMA-ES), and
   wherein the texture search comprises:
   a. sampling a first set of latent variables from a normal distribution having a same dimensionality as the latent space of the texture model generator;

b. inputting the first set of latent variables to the texture model generator to generate one or more texture models;
c. rendering the one or more texture models via a haptic user interface to allow users to touch the one or more texture models;
d. receiving a user selection of a texture model from the one or more texture models, the user selected texture model being closest to a given real texture;
e. updating, based on the user selected texture model, a mean of the normal distribution;
f. adapting a covariance of the normal distribution to increase a probability of the texture search; and
g. sampling a second set of latent variables using the updated normal distribution and performing steps a-f until the user is satisfied that the selected texture model is close enough to the given real texture.

* * * * *